(12) United States Patent
Hughes

(10) Patent No.: US 6,854,009 B1
(45) Date of Patent: Feb. 8, 2005

(54) NETWORKED COMPUTER SYSTEM

(75) Inventor: Trevor Hughes, Mt. Laurel, NJ (US)

(73) Assignee: Tacit Networks, Inc., South Plainfield, NJ (US)

( * ) Notice: Subject to any disclaimer, the term of this patent is extended or adjusted under 35 U.S.C. 154(b) by 0 days.

(21) Appl. No.: 09/469,834

(22) Filed: Dec. 22, 1999

(51) Int. Cl.[7] .................. G06F 15/177; G06F 15/16; G06F 9/44; G06F 9/445
(52) U.S. Cl. ................ 709/220; 709/219; 717/176; 717/171; 717/173
(58) Field of Search ................. 717/171, 174, 717/173, 176; 709/220, 219, 106; 711/100

(56) References Cited

U.S. PATENT DOCUMENTS

| | | | |
|---|---|---|---|
| 5,442,771 A | * 8/1995 | Filepp et al. ............. | 709/219 |
| 5,475,819 A | 12/1995 | Miller et al. ............ | 395/200.03 |
| 5,675,800 A | 10/1997 | Fisher, Jr. et al. ......... | 395/700 |
| 5,765,205 A | 6/1998 | Breslau et al. ............ | 711/103 |
| 5,790,753 A | 8/1998 | Krishnamoorthy et al. ................. | 395/200.33 |
| 5,826,000 A | 10/1998 | Hamilton ............... | 395/180.02 |
| 5,842,011 A | 11/1998 | Basu ..................... | 395/652 |
| 5,852,722 A | 12/1998 | Hamilton ............... | 395/200.51 |
| 5,870,554 A | 2/1999 | Grossman et al. ....... | 395/200.52 |
| 5,889,990 A | 3/1999 | Coleman et al. ......... | 395/682 |
| 5,919,247 A | 7/1999 | Van Hoff et al. ......... | 709/217 |
| 5,925,103 A | 7/1999 | Magallanes et al. ...... | 709/230 |
| 5,926,631 A | 7/1999 | McGarvey ............... | 395/500 |
| 5,935,249 A | 8/1999 | Stern et al. .............. | 713/201 |
| 5,944,608 A | 8/1999 | Reed et al. ............... | 463/40 |
| 5,963,743 A | * 10/1999 | Amberg et al. ........... | 717/174 |
| 6,226,665 B1 | * 5/2001 | Deo et al. ................. | 709/106 |
| 6,385,766 B1 | * 5/2002 | Doran et al. .............. | 717/174 |
| 6,449,682 B1 | * 9/2002 | Toorians .................. | 711/100 |
| 6,470,496 B1 | * 10/2002 | Kato et al. ................ | 717/173 |
| 6,557,169 B1 | * 4/2003 | Erpeldinger .............. | 717/173 |
| 6,640,334 B1 | * 10/2003 | Rasmussen ............... | 717/171 |

OTHER PUBLICATIONS

Anderson et al., "A Case for NOW (Networks of Workstations)", Dec. 9, 1994, p 1–20.
Culler et al., "Parallel Computing on the Berkeley NOW", p 1–11.
The Berkeley NOW Project, p 1–2.
SETI@home, "How SETI@home works", p 1–16.
CITRIX, "Citrix and Windows 2000 Positioning Points", p 1–3.
StorageTek, Level 3 make storage pact, p 1–3.
Sun Ray™ 1 Enterprise Appliance, "Hot Desk Architecture", p 1–19.

* cited by examiner

Primary Examiner—William A. Cuchlinski, Jr.
Assistant Examiner—Michael Delgado
(74) Attorney, Agent, or Firm—Norris, McLaughlin & Marcus

(57) ABSTRACT

A networked computer system has a plurality of servers and a plurality of distributed clients, which may be devices or computers. Each client has a boot operating system (OS). Upon startup, the boot OS in each client automatically initiates a connection to one of the servers via the Internet. The boot OS can detect the type of medium (e.g., cable modem, DSL) to which the client is connected. The server automatically downloads a base OS and dynamically configures a suite of applications on the client without running the standard installation programs. One included application is an Internet telephony application, allowing a user to plug a standard telephone into the client appliance or computer, pick up the telephone, and automatically dial out using long distance Internet telephony. Optionally, the server may download a plurality of operating systems that are automatically initiated to run concurrently on the client. The clients use a random access memory (RAM) caching technique. A first portion of each OS or application is downloaded at startup and maintained in the client RAM, containing the files needed to launch the OS or application. If the client processes a request for an OS or application program file not in the client's RAM, the requested file is automatically downloaded from the server.

8 Claims, 18 Drawing Sheets

NETWORKED COMPUTER SYSTEM

FIELD OF THE INVENTION

The present invention relates to the field of telecommunications generally, and more specifically to networked computer systems including server processors and thin clients.

DESCRIPTION OF THE RELATED ART

In recent years, acceptance of computer technology and use by both consumer and commercial customers has been greatly hindered by several factors relating to maintenance and difficulty of configuring computer software and hardware. Traditionally, both private and commercial users of computers have been plagued by maintenance and configuration problems that have required the attention of an on-site technician. For commercial users of computers and software, this tends to be a tremendous addition to the cost of doing business and clearly affects the rate at which many companies can grow and ultimately compete in industry. For consumers, the need for expert assistance in maintaining and installing software and hardware used for household computing is rather intimidating and thus inhibits the average consumer's ability to fully use currently available technologies. The high price of PCs (personal computers) and software is also a factor in discouraging complete market penetration and subsequent use of the latest available technologies on both commercial and consumer fronts.

At the same time, software companies' inability to protect proprietary programs and affordably distribute and support their products negatively impacts their bottom line profitability, thus slowing the advance of new technologies. Software pirating is a rampant problem worldwide, and international law has not yet given software development companies the tools they need to effectively discourage the most significant overseas offenders. The advent of writable CD ROMs has made software copying a more threatening problem than ever before, both in the US and abroad.

Additionally, recently developed technologies have allowed the transport of voice transmissions over the Internet in much the same manner as other data. Some companies have begun to provide hop-off points from the Internet onto the public switched telephone network. This allows a user the ability to make telephone calls from anywhere in the world when connected to the Internet. These telephone calls are now local calls if the call destination is within the local calling area of one of these companies. While this has resulted in the ability of individuals and industry to greatly reduce their long distance phone bills, the complicated configuration issues surrounding this technology have contributed to low levels of market penetration. In addition, many implementations are substandard and have led to customer dissatisfaction.

In the U.S., the number of households/businesses that have not yet embraced the latest computer and software technology is remarkably high. It is a widely accepted belief that, as the cost of computers and software falls, the number of users will increase in direct relation to the increased affordability of these technologies.

Consequently, a need exists for a new apparatus and method by which both commercial and consumer computer and software users can alleviate the exorbitant costs and downtime associated with software and hardware installation, configuration and maintenance.

SUMMARY OF THE INVENTION

One aspect of the invention is a method and apparatus for operating a computer system including at least a server and a client that are connected to each other by a type of connection. The method comprises the steps of: starting the client with a boot operating system; automatically establishing a communications session corresponding to the type of connection between the server and the client; downloading at least a first portion of a base operating system from the server to the client; and automatically launching the base operating system in the client after the downloading.

Another aspect of the invention is a method and apparatus for operating a computer system including a server and a client. The method includes downloading a first portion of an application program from the server to the client. The first portion of the application program contains a first plurality of program files. The application program further includes a second portion containing a second plurality of program files. The second plurality of program files is not included in the first plurality of program files. The application program is designed to operate only with the first plurality of program files stored locally and the second plurality of program files stored locally. The application program is launched in the client, while the first portion of the application program is stored locally in the client, but the second portion of the application program is not stored locally in the client. A request for one of the second plurality of program files is processed in the client. At least one of the second plurality of program files is automatically downloaded from the server to the client. The at least one of the second plurality of program files is used in the client.

Another aspect of the invention is a method and apparatus for operating a computer system including a server and a client. The method includes the steps of downloading at least a first portion of a base operating system from the server to the client upon startup of the client, the first portion of the base operating system including a plurality of operating system files that are not stored locally in the client before the downloading; launching the base operating system in the client after downloading the first portion; downloading at least a first portion of a second operating system from the server to the client; and spawning the second operating system from the base operating system in the client, the base and second operating systems running concurrently in the client.

Another aspect of the invention is a method and apparatus for operating a computer system including a server and at least one client. The method comprises the steps of: downloading at least a first portion of a base operating system from the server to the client after startup of the client; launching the base operating system in the client; automatically tracking a first length of time during which the client runs the base operating system; and automatically debiting a first account record in the server by a first amount based on the first length of time, the first account record being associated with an owner of the client.

Still another aspect of the invention is a method and system for configuring computer programs on a client that is coupled to a server. The method comprises identifying a first plurality of computer programs that are listed in a user profile associated with a user of the client. The first plurality of computer programs are associated with the user. A database is queried. The database identifies dependencies among a second plurality of computer programs that are stored on the server. The first plurality of computer programs is a subset of the second plurality of computer programs. Dependencies are identified among the first plurality of computer programs based on the querying. Configuration files that are required to execute any of the first plurality of computer programs in the client are automatically generated, without executing any installation programs associated with any of the first plurality of computer programs.

The above and other features of the present invention will be better understood from the following detailed description of the exemplary embodiment of the invention which is provided in connection with the accompanying drawings.

OVERVIEW

Figure 1A:
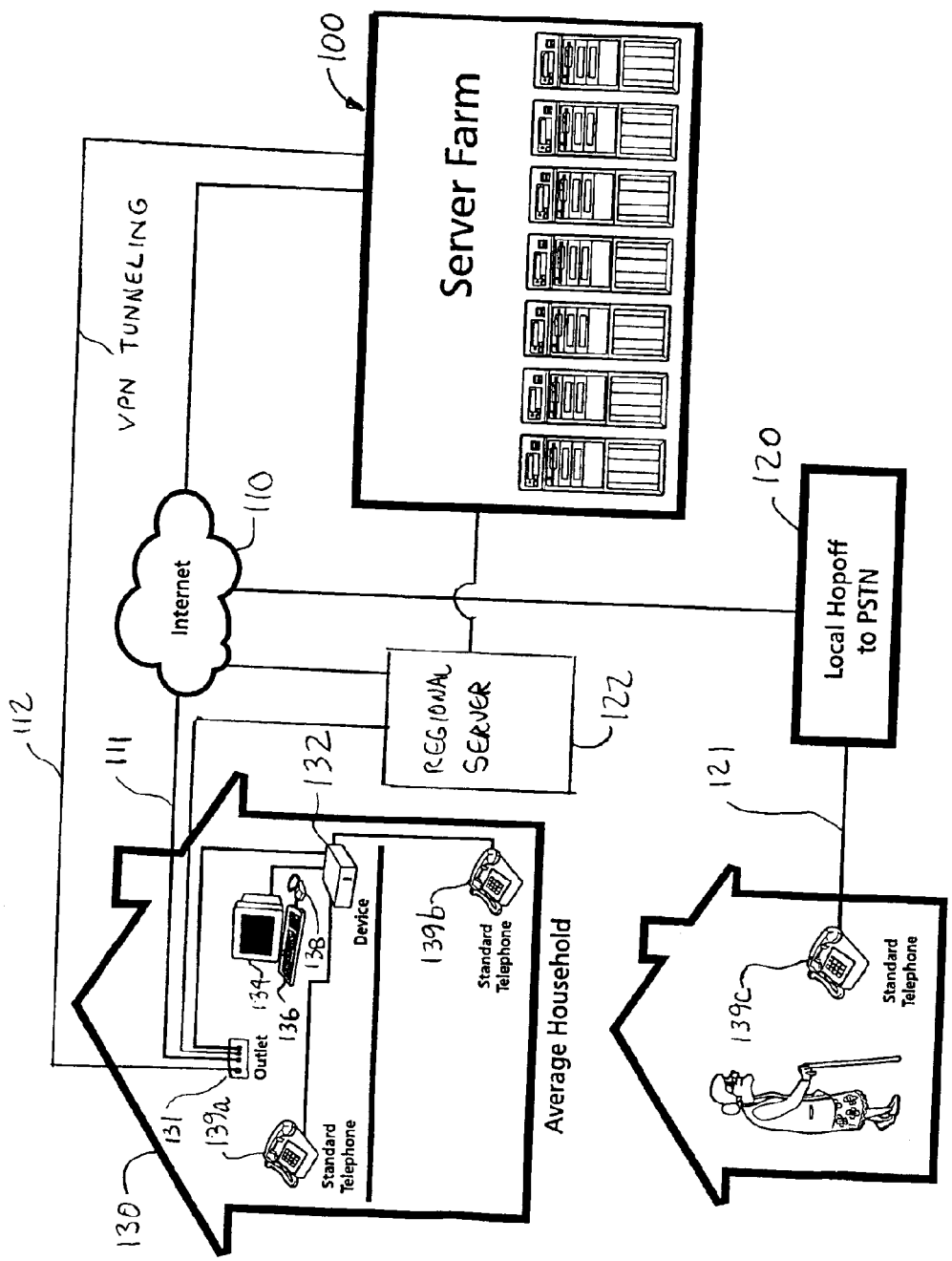
FIGS. 1A and 1B are block diagrams showing respective portions of an exemplary networked computer system according to the present invention.
Figure 1B:
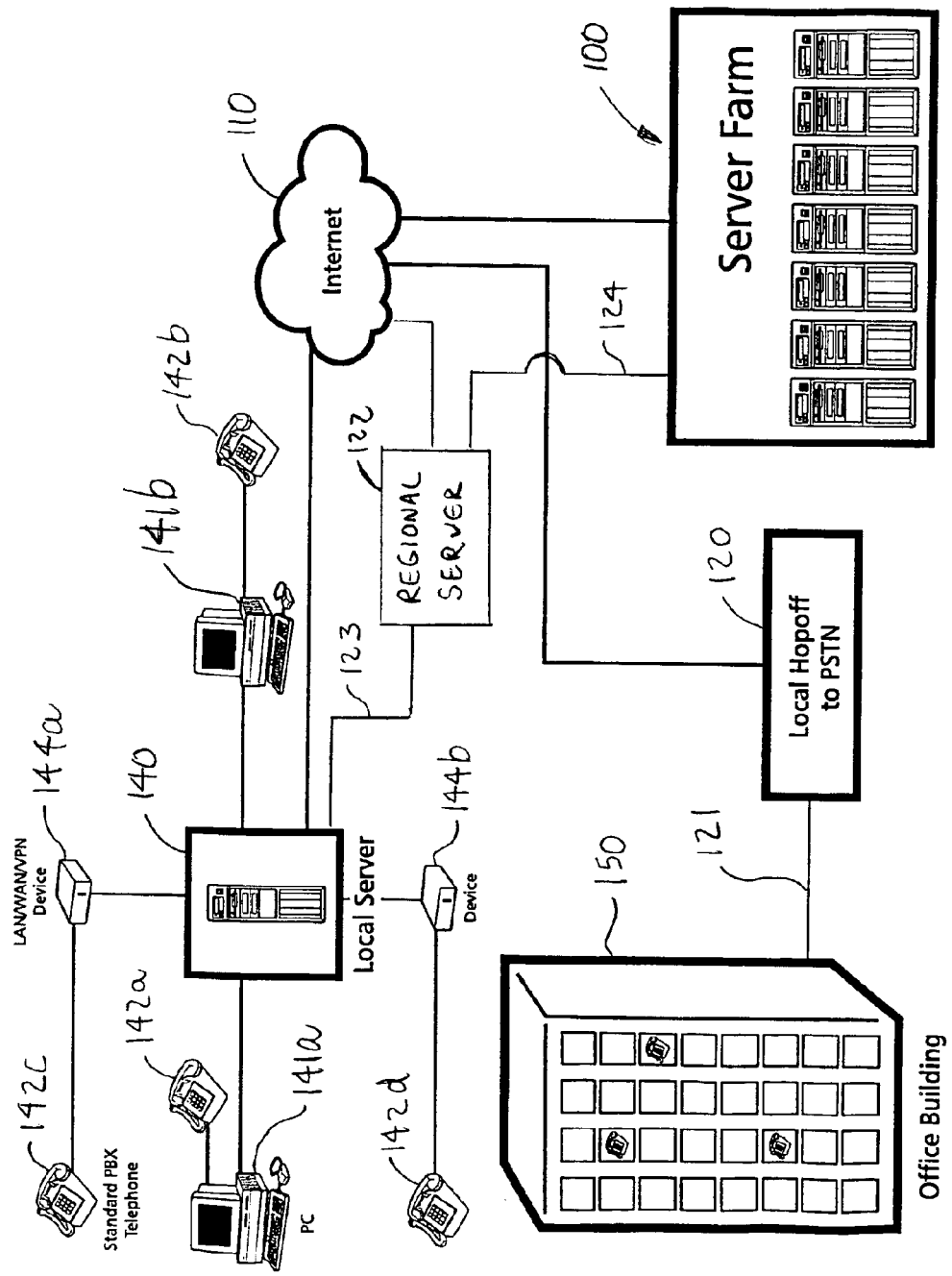

FIGS. 1A and 1B show two portions of an exemplary networked computer system according to the present invention. The system includes a server farm 100 which includes a plurality of fileservers. A plurality of clients 132, 141a, 141b can be connected to the server farm 100 by way of the Internet 110. The clients may include thin client appliances (devices) 132 and/or personal computers 141a, 141b in any combination. The clients connect to a site on the Internet to establish a session with one of the servers of the server farm 100.

FIG. 1A shows exemplary consumer users connected to the system, and FIG. 1B shows exemplary commercial users. The exemplary embodiment includes a new scaled down version of a computer that requires no manual software installation or maintenance to be performed locally. This new PIA/PNA (Personal Internet Appliance/Personal Network Appliance, hereinafter referred to as "appliance 132") offers users the ability to use the same variety of programs currently available for traditional PCs 141a, 141b today. The appliance 132 is able to operate like a full scale computer 141a.

A typical consumer user can connect to the network via one of two different mechanisms. The very first time a user connects to the system, an initial connection is formed over a telephone line or Ethernet connection to a local server (discussed in greater detail below) when the client 132, 141a is started up, and may use virtual private network (VPN) tunneling. Preferably, the initial connection provides security by encryption, and on-the-fly compression. (The type of compression may vary depending on the type of files downloaded, and is determined by the server). Compression may be used on any link between the server farm 200 and the client 132, 141, as described below with reference to FIG. 1B. This initial connection may be formed using a reduced version of the operating system (OS), referred to hereinafter as the "boot operating system."

Subsequent connections to the network are preferably formed using Internet Protocol (IP) on a high speed communications link, such as an Ethernet coupled to a cable modem, satellite link, or digital subscriber line (DSL). These connections may be made with the server farm 100, or with a regional server 122, described below with reference to FIG. 1B. Alternatively, low speed (dial-up) connections may be used for subsequent connections, although performance is not as good with a dial-up connection. Performance using a low-speed dial-up connection may be improved by using an external hard drive for local caching of program files and data, as described below.

Referring again to FIG. 1A, appliance 132 may include a mother board and sound card, a video card, ports to plug in a keyboard and a monitor as well as some other digital equipment, but need not have a hard drive installed in it. Upon startup, appliance 132 automatically calls up the server farm 100 through either a telephone wire 112 or a cable modem, a digital subscriber line (DSL) or a network cable 111 on either a wide area network (WAN) or a local area network (LAN) to one of the remote servers in the server farm 100. The remote server acts as an application host and allows the user of the appliance 132 to choose from a number of operating systems offered by the remote server. For example, the user can choose to operate in Windows NT, Windows 95, Windows 98, or Linux. Once the automatic download of the OS is completed, the user is then able to choose from a number of applications. The applications may be the same applications that are commonly locally installed. The applications can be downloaded when they are to be used, without incurring large delays. The downloaded software is stored in random access memory (RAM), at least until the user logs out of the system. User data are stored on one of the severs of the server farm 100. No results have to be stored locally. Because all software is downloaded from the network, and all work is remotely saved in the server farm 100, the appliance 132 need not have a hard drive. The appliance can thus be less expensive than a conventional computer.

Alternative local computing devices may include microcomputers 141a, 141b (e.g., desktop, laptop and the like).

The software needed to form the initial connection to the servers in the server farm 100 may be provided in a removable, bootable medium (e.g., floppy disk). Because the system does not require any local permanent storage, a computer 141a can be used to provide the same functions as the appliance 132 without changing the computer's configuration. As another alternative, a boot ROM may be installed in a card in a conventional computer to convert it to operate like appliance 132. The term "client" is used herein to refer to either a diskless appliance 132 or a fully configured computer 141a, 141b that is used to access the system.

FIG. 1B shows another part of the same network shown in FIG. 1A. Commercial enterprises may be connected to the system, preferably via a local area network (LAN) server 140. The server 140 may conveniently be used to download the boot OS, base OS and applications to all of the local clients 141a, 141b. As in the case of the consumer, a commercial user may access the system via an appliance 132 or a computer 141a. The local server 140 allows any number of clients in the enterprise to connect to the server farm 100 via a single cable modem, DSL, or satellite link, to which server 140 is connected. The clients 132, 141 are in turn connected to the local server 140 by a LAN connection method, such as Ethernet.

The local server 140 acts as a local cache for the server farm. Each user that accesses the system 100 through the server 140 has at least one profile identifying any OS or application program that is required by that user. When the user's profile is first identified to the local server 140, the server 140 requests (from server farm 100) the applications and images that are required to service that user. The local server 140 also receives a mirrored copy of the on-the-fly configuration server 204. Subsequently, when the user logs on to the system 100 by way of client appliance 132 and the local server 140, any OS or application images, databases, electronic mail or other data required by the user can be downloaded from the server 140, which reduces latencies that would be encountered if the software were downloaded directly from the server farm 100. The on-the-fly configuration server program in the local server can download necessary program files and data files from the local server 140 to the client 132, and passes authentication and tokening back to the server farm 100. Thus, the program files and data are mirrored down through local servers to be close to the clients (in terms of communications latencies).

Preferably, the server 140 is administered by the owner of the system. The local server 140 may be connected to the server farm 100 via a direct leased line or the Internet. Because the local server 140 pre-fetches or downloads files from the server farm 100 before they are required to be downloaded to the clients 132, 141a, an Internet link is expected to provide adequate bandwidth between the local server 140 and the server farm 100.

In addition to the local server(s) 140, the system may include one or more regional servers 122. The regional servers 122 perform a function similar to the local servers 140, namely caching program files and data for all the applications required by any local server(s) 140 that are connected to the regional server 122. When a local server 140 is first registered with a regional server 122, the regional server identifies any program files and data that are needed by the local server 140. Any of these files not already present in the regional server 122 are downloaded from the server farm 100 to the regional server 122. All of the needed files are downloaded from the regional server 122 to the local server 140.

Preferably, the regional servers 122 are co-located at the central switch locations for telecommunications companies. For example, a regional server 122 may be located at the facility of a regional cable company. Any local server 140 (or consumer client 132) that is connected to that cable company by a cable modem link can download files from the regional server 140 very rapidly, without the need to download directly from the server farm 100. Similarly, telecommunications companies providing DSL or satellite links to businesses and/or consumers may have a co-located regional server 122 for all of the clients 132 and local servers that subscribe to the DSL or satellite services provided by the telecommunications companies. The regional server(s) 122 may be connected to the local server 140 and server farm 100 via direct leased lines or via the Internet.

Using the regional server(s) 122 and local server(s) 140, the on-the-fly-configuration server 214, OS server 210 and application server 212 are mirrored down the chain, as close to the clients 132, 141a as possible. Nevertheless, regardless of where a client 132, 141a downloads a file from, authentication and tokening are passed back to the authentication server 216 in the server farm 100, to ensure proper security and configuration management, and prevent software pirating.

As noted above, compression may be used on any link between the server farm 100 and the client 132. However, in the exemplary embodiment, compression is not used between the clients 132 and the local server 140, because the speed of the Ethernet is so high that compression could actually slow down the transmission between the server and the client. The exemplary embodiment uses two public domain software methods for transmission between the local server 140, regional server 122, and server farm 100: Blowfish is used for encryption, and LZO is used for compression.

The system allows users the opportunity to travel without carrying a specialized appliance or smart card. The system can be accessed from anywhere in the world via the Internet (for a consumer or commercial user) or via a LAN or WAN that may be available for commercial users. Regardless of the local client device used, the user can log in and enter a password; access is automatically provided to all the user's personal array of files and applications. Appliance 132 offers unprecedented data portability and security through the use of remote data storage and access. By using remote boot technology, this software/hardware system allows the user's personal data/software to be non-specific to any appliance 132, PC or traditional computer 141a, yet to be accessible through any hardware that can be linked to the remote server 200 or applications hosting site 100. Ultimately, a user's data/software follows the user wherever he or she goes and alleviates the need for data/software to be specific to any particular hardware.

The appliance 132 has an RJ11 connector, so that a user can plug a standard telephone handset into the appliance 132. The appliance is pre-configured to automatically allow plug-n-play Internet phone access. The user connects to a server in the server farm 100 and automatically, the telephone is available to make phone calls via the Internet. The system owner maintains local hopoffs 120 to public switched telephone networks (PSTN) 121, so that users can use the Internet telephone capability to reach people who are not subscribers of the system. Because every call made is a local call to the server farm 100, large savings are obtainable for long distance calls.

The users can buy or lease appliance 132, or, in some cases, enter into a long-term service agreement with the system owner to obtain the appliance for free. The user uplinks to the system applications hosting server and has access to both the OS (or multiple OS's) and applications of her choice on a pay-as-you-go basis, so that no up-front heavy charges are required for the software packages that she is using. Instead, the clients can download and use OS and application software whenever they need to use it. The users can be guaranteed access to the latest version of whatever software is being used. The system owner ensures software compatibility, so there are no conflicts or configuration issues for the user to deal with. The users can be charged a low monthly fee covering their actual use of the OS's and applications of their choice (which may be on the order of $50–$60 per month as opposed to up front costs on the order of $4000 for a fully configured state of the art computer with software.

Users are be able to sample software without the need to install programs locally and do not need to configure any software that they use. Users can choose operating systems in which they run applications and switch operating systems as needed without re-booting the client devices 132, 141a. Users are given the ability to operate within multiple operating systems concurrently, offering unprecedented flexibility. Security may be implemented using Linux ipchains, a public domain capability used by current Linux firewalls.

The exemplary system provides a secure computing environment with the capability to implement parental controls. Any access by a client to an Internet site is remotely configured by one of the servers in server farm 100, allowing parents to control access by their children.

In addition to convenience for the user, the user is easily able to download and run additional applications as needed to serve his or her expanding personal business computing needs. This also reduces the likelihood of software being pirated, because the programs that are downloaded to the appliance 132 are not stored locally. The system logs and maintains records for the amount of time that each OS and application product is used by each user. Software companies can bill one customer—the system owner, for licensing. Through licensing agreements, software vendors charge the system owner for the exact usage of each software product. The system owner pays the software companies a portion of the revenue collected from the end-users.

DETAILED DESCRIPTION

Figure 2:
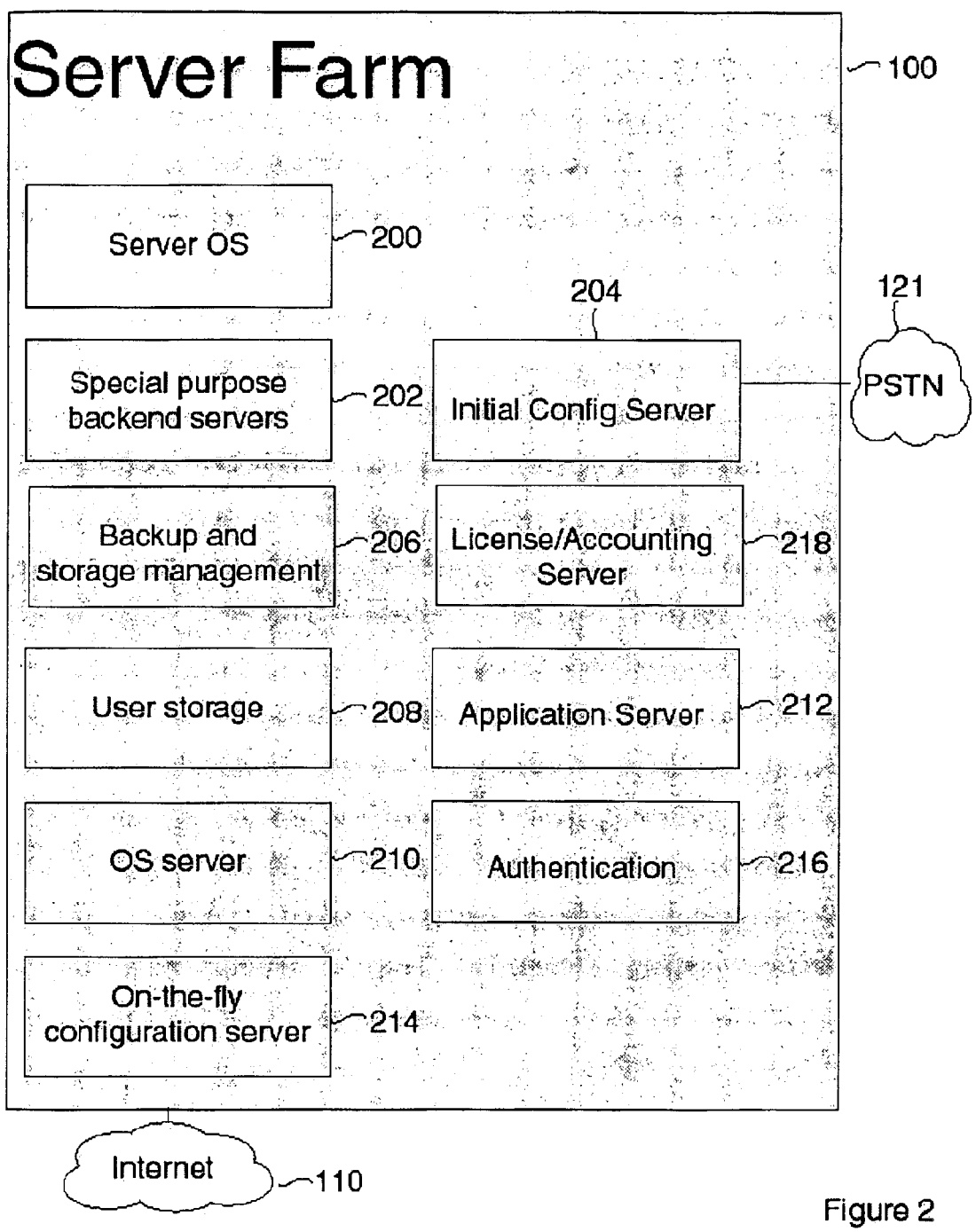
FIG. 2 is a block diagram showing the exemplary server farm of FIGS. 1A and 1B.

FIG. 2 is a block diagram of the server farm 100. The server farm is a LAN having a plurality of server processors 200–216. One of the servers 200 runs the network operating system and the server OS, which may be Redhat Linux, or another binary compatible version of Linux. An initial configuration server 204 has the files on disk to download a base operating system (such as Red Hat Linux) to the clients. An OS server 210 also has files that can be downloaded to the clients to run other operating systems besides Linux.

When the user starts up the appliance 132 or computer 141a, a reduced version (the boot OS) including the kernel of the Linux operating system is started, from a boot ROM or floppy. The boot operating system connects up to the server owner's hosting server on the Internet using whatever method (cable modem, DSL, etc.) is specific to the user's location. The client 132, 141a sends its request over the Internet 110 to the initial configuration server 204 requesting the files associated with the users profile (or a selected one of the user's profiles, if the user has more than one profile).

When a client connects to the network server 200, the initial configuration server 204 performs a look up in a profile database to determine what operating systems and applications are included in the user's profile. Based on the profile, the initial configuration server 204 fetches all of the basic files needed to run each OS and application, puts them together into one block, and downloads them to the client. Server 204 dynamically puts all the needed files together (including any files needed by one of the applications to run cooperatively with another of the applications, and frequently-used files), and downloads just those files into the main memory (system RAM—not the hard drive) of the client 132, 141a. Typically, this includes a first portion of each operating system and each application in the user's profile, the first portion including only files required to launch the OS/application and frequently used files. The files are downloaded in a compressed format to reduce download time. Because only the necessary/frequently used files are transferred to RAM (not a disk), and because a high speed (e.g., cable modem or DSL) link 111 is used, the time required to boot the client 132, 141a is comparable to the time that would be required to boot a system with a locally stored operating system from a hard drive.

The initial configuration server 204 and on-the-fly configuration server 214 determine which OS and program files are need at the client. The OS server 210 stores images of a variety of OS's and provides the client 132, 141a with an image containing whatever operating system files are needed to launch each of the OS's listed in the user's profile (There may be more than one OS in the profile). The OS server only executes one OS (which may be, for example, Linux), but stores copies of, and can provide, an image of any desired OS to a client. The application server 212 provides any program files needed to launch all of the applications in the user's profile. Typically, complete versions of the OS's and applications are not sent at startup. Only files needed to launch the OS's and applications are initially downloaded; additional OS files and/or program files are downloaded later when requested (e.g., invoked by the software in the client during execution of a program).

The on-the-fly configuration server 214 ensures that any configuration files required to allow two programs to operate concurrently are included in the download, determines any changes that must be made in the client's registry to run the applications, and updates the icons on the client's desktop. At various times before the downloading is actually performed, the authentication server 216 verifies that the user is authorized to download files. The on-the-fly configuration server 214 merges the OS and applications into one transmission and downloads them. In addition, the data that the user has previously stored on a user storage server 208 are downloaded to the client. When all of the files are downloaded and the base OS is launched in the client 132, 141a, the authentication server determines whether the user is authorized to access the system (e.g, by password, smart card, fingerprint, iris recognition, voice recognition, or any other authentication system).

User data which have not been recently accessed may be offloaded to a less expensive, longer response time medium (e.g, tape or CD-ROM) under control of the backup and storage management server 206. A conventional hierarchial storage management system can be used to offload the least recently used files from the (relatively) rapid disk drives of the user storage server 208, and to retrieve the off-loaded files automatically if they are subsequently requested.

In addition to the servers described above, one or more special purpose back-end servers 202 may be included to provide any special services the system owner wishes to offer. For example, in the exemplary embodiment, the special purpose servers 202 include a telephone server that allows users to place long distance telephone calls over the Internet, as described below. As another example, a service for custom (as opposed to standard) profiling, may be provided for customers who require numerically intensive computing, for example, to perform video editing. A back-end server may be temporarily allocated to such a numerically intensive computing project.

A license/accounting server 218 (described in greater detail below with reference to FIG. 15) tracks the payment plan or licensing option for each user, and tracks the time each program (OS or application) is used by each user. Based on this information, the license/accounting server determines the charges to each client's account and the payments owed to software developers, either on a periodic basis or on a transactional basis. In addition, the license/accounting server 218 calculates credits that a user may accrue by allowing one of the special purpose backend servers 202 to execute jobs on the client 132, 141$a$ while the user is not running any of his or her own programs. In essence, license/accounting server 218 provides a mechanism by which the user can sell CPU cycles to the system owner in exchange for reductions or credits on software licensing or rental fees.

Figure 3:
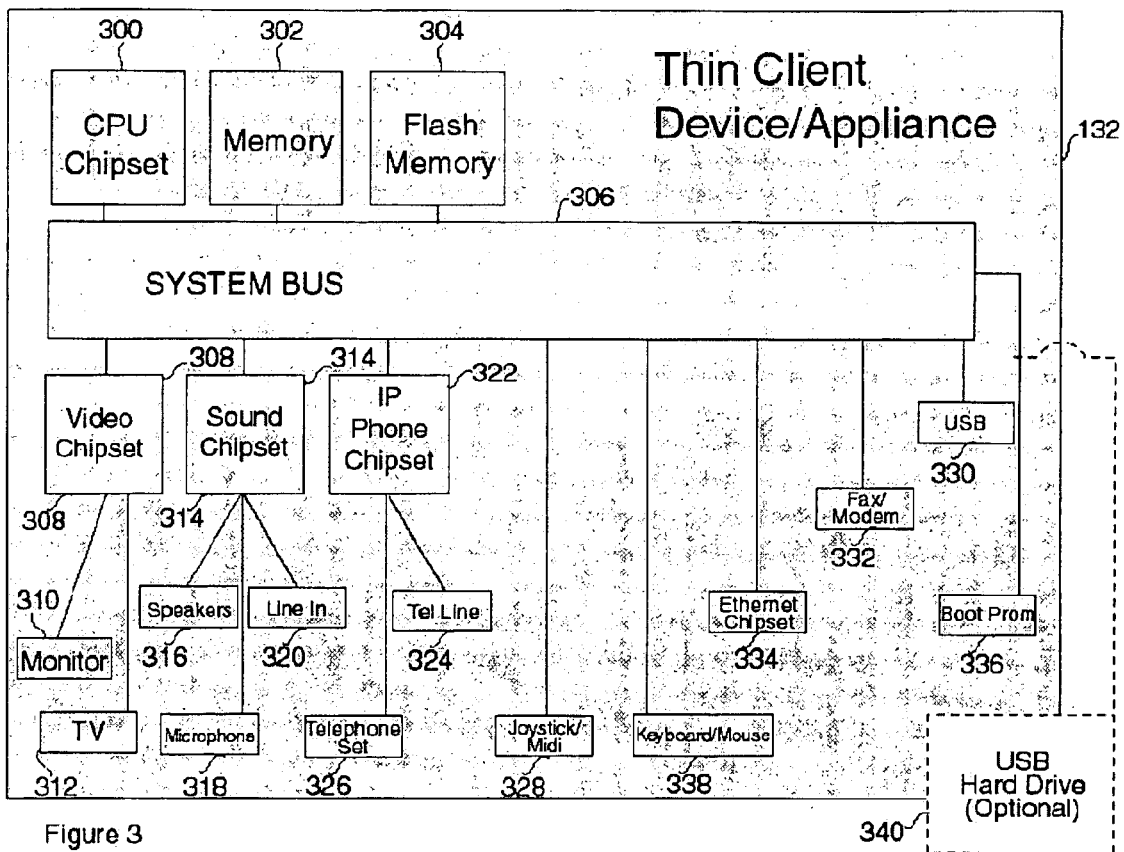
FIG. 3 is a block diagram of the hardware in exemplary thin client appliance of FIGS. 1A and 1B.

FIG. 3 is a block diagram of an exemplary thin client device/appliance 132, as shown in FIG. 1. The appliance 132 of FIG. 3 is fully configured with essentially all of the features of a personal computer except for a hard disk drive. The system includes a central processing unit (CPU) 300, which may be a "PENTIUM III™" or "CELERON™" processor manufactured by the Intel Corporation of Santa Clara, Calif., or another processor of similar capabilities, such as those manufactured by Advanced Micro Devices or Cyrix.

Appliance 302 has a relatively large main memory 302, preferably at least 128 Megabytes of RAM, more preferably 192 or 256 megabytes. Memory 302 is sized to store the OS software and application software that are specified by the users profile. Because there may be no hard drive in appliance 132, memory 302 needs sufficient space both for the applications that are currently executing and for the remaining applications which are not executing, but are nevertheless stored in RAM. As described in greater detail below, memory 302 need not be large enough to store all of the program files that would normally be installed on a hard drive in a typical installation. Frequently used files and files needed to launch each application are loaded into memory 302 upon startup. Any other files that are required during execution are downloaded on an as-needed basis.

A flash memory (which may be an electrically erasable programmable read only memory, or EEPROM) 304 is provided for storing the boot OS. Flash memory 304 also stores a plurality of software modules, each of which is used to form an initial connection with a respectively different type of communications medium (e.g., cable modem, DSL. satellite link, or the like). As explained below with reference to FIG. 12, upon startup, the boot OS determines the type of medium to which the client 132, 141$a$ is connected and forms the appropriate connection for that medium. An alternative to using the flash memory 302 for storing the boot OS is to use a boot PROM 336. The EEPROM implementation is advantageous because software for new custom connection methods is easily flashed into the memory 304.

The system bus 306 may be a conventional 66 or 100 Megabit bus; the latter is preferred. Several additional chipsets may be provided. In the exemplary appliance 132, a video chipset 308 drives a monitor 310 and/or a television 312. A sound chipset 314 drives a pair of speakers 316, a microphone 318, and receives an input line 320. Preferably, an IP phone chipset 322 drives a telephone set 326 and telephone line 324. (The IP phone interface is described in greater detail below with reference to FIG. 5.) Additional interfaces include a joystick and/or midi interface 328, a keyboard and pointing device (e.g., mouse, track ball, or the like.), Ethernet LAN interface 334, fax/modem 332, and universal serial bus (USB) port 330. These interfaces are well known in the art and are not described in detail herein.

Generally, a hard drive is not required. An external hard drive 340 may optionally be used for specialized purposes. These special purposes may include, but are not limited to: (1) providing a local file cache to reduce latencies from transmission over low-speed (dial-up) links; (2) local (redundant) backup for important files; (3) to provide a first-in, first-out queue to smooth the data rate for applications that process wideband data (e.g., on-demand video or audio) downloaded from the Internet, or other network; or (4) a user who has too many programs in his or her profile (or too many profiles) to accommodate all programs in RAM could store the programs on the hard drive.

In one example, the USB hard drive 340 is used as a local file cache for an appliance connected via dial up links (e.g., a V.90 modem, either of the 56K or X2 type). When a client 132 including a local hard drive cache is first identified as such to the initial configuration server 204, the server 204 downloads data to set up the hard drive as a local cache. More specifically, the initial configuration server 204 downloads files to the appliance 132 for storage on hard drive 340, as though it is the hard drive of a local server 140. This includes transmitting all of the program files for the applications and OS's listed in the user's profile. Because of the low data rate, this initial download may take several hours. After the external hard drive 340 is configured, when the appliance 132 is started, the programs in the users profile are configured on the fly and loaded into the RAM of the client 132. Once the files are downloaded to the external hard drive 30, there is no need to download files from the server farm 100 until the user changes his or her profile, or one of the programs is updated.

The exemplary embodiment includes a plurality of on-board chipsets for controlling peripheral devices, with all expansion accomplished through the USB port 330. Any USB compatible device can be connected via the USB port 330. Nevertheless, separate device adapter cards (e.g., sound card, video/graphics adapter, fax/modem and the like) may be used in alternative embodiments. Such cards may be connected to the system bus by way of a conventional PCI or ISA bus (not shown).

Appliance 132 alleviates the need for expert assistance when dealing with changes in software used. Storage media in the exemplary appliance 132 are completely solid state with no moving parts (i.e., no magnetic hard drive or CD-ROM is required), thus circumventing the need for a technician to maintain the device and reduces the number of potential hardware and software failures.

Appliance 132 may have a battery (not shown) to maintain the memory 302 active, in the event of a power failure.

Figure 4:
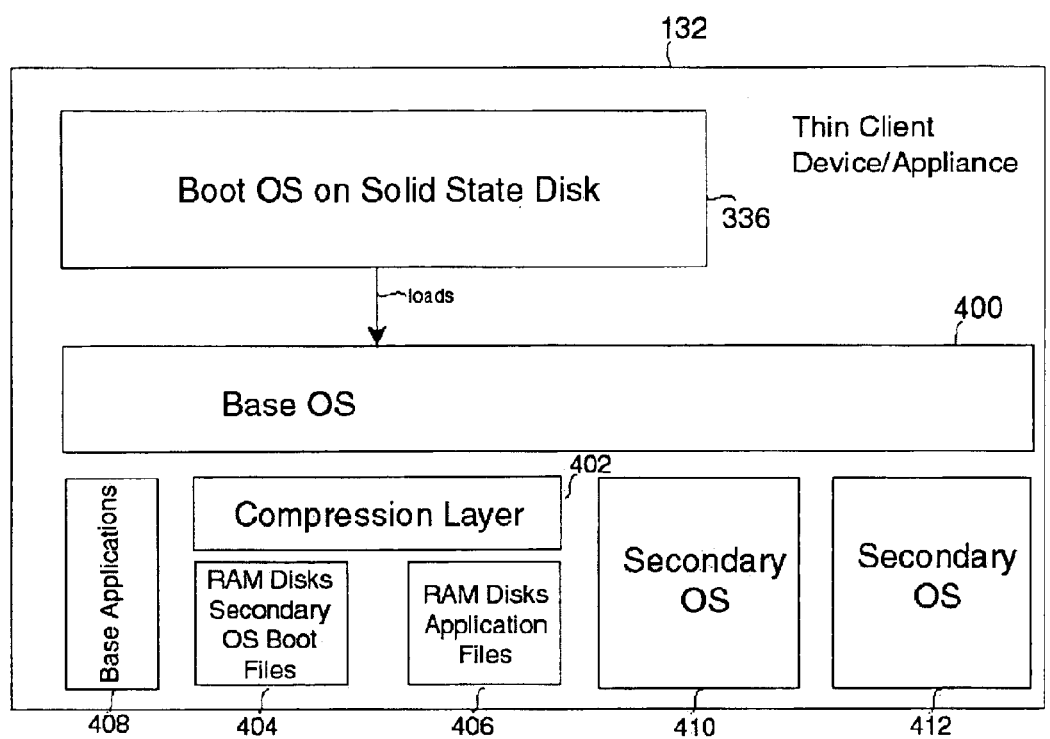
FIG. 4 is a block diagram of the exemplary computer shown in FIG. 1B.

FIG. 4 is a block diagram showing in greater detail how software applications are configured in the appliance 132. Upon power-up, the boot OS is loaded from the solid state disk (boot PROM) 336 into RAM 302. The boot OS plays a limited role in the operation of the client. The very first time the appliance starts up, it automatically dials up the server farm 100 (possibly via a telephone line and modem) and directly connects to the initial configuration server 204. During the first session, an updated startup connection module may be downloaded and flashed into the flash memory 304, so that all future connections may be made by way of a high speed link (e.g., cable modem, satellite modem, DSL or the like). Details of this startup module are described in greater detail below with reference to FIG. 12.

When the connection is completed, the boot OS automatically initiates an Internet connection with the system's hosting site. The boot OS also includes a code or checksum that is interrogated by the initial configuration server. This code or checksum indicates that the main memory (RAM) 302 is empty, except for the boot OS. The initial configuration server 204 downloads compressed disk image corresponding to the user into the compression layer 402 in the client 132, 141a. This includes at least a first portion of the base OS 400, secondary OS(s) 410, base applications 408 and other applications 406 in the profile. The first portion of base OS 400 and applications 406, 408 include the files needed to launch these programs, plus program files that are expected to be used frequently. The first portion of the base OS 400 and applications 406, 408 are decompressed and stored in a separate location (from the compressed files) in RAM. During the user's session, any documents and data files that are worked on in RAM locally are mirrored up on the user storage server 208. Any time a "save" is executed, the pertinent file is saved to a network drive on the user storage server 208.

Figure 5:
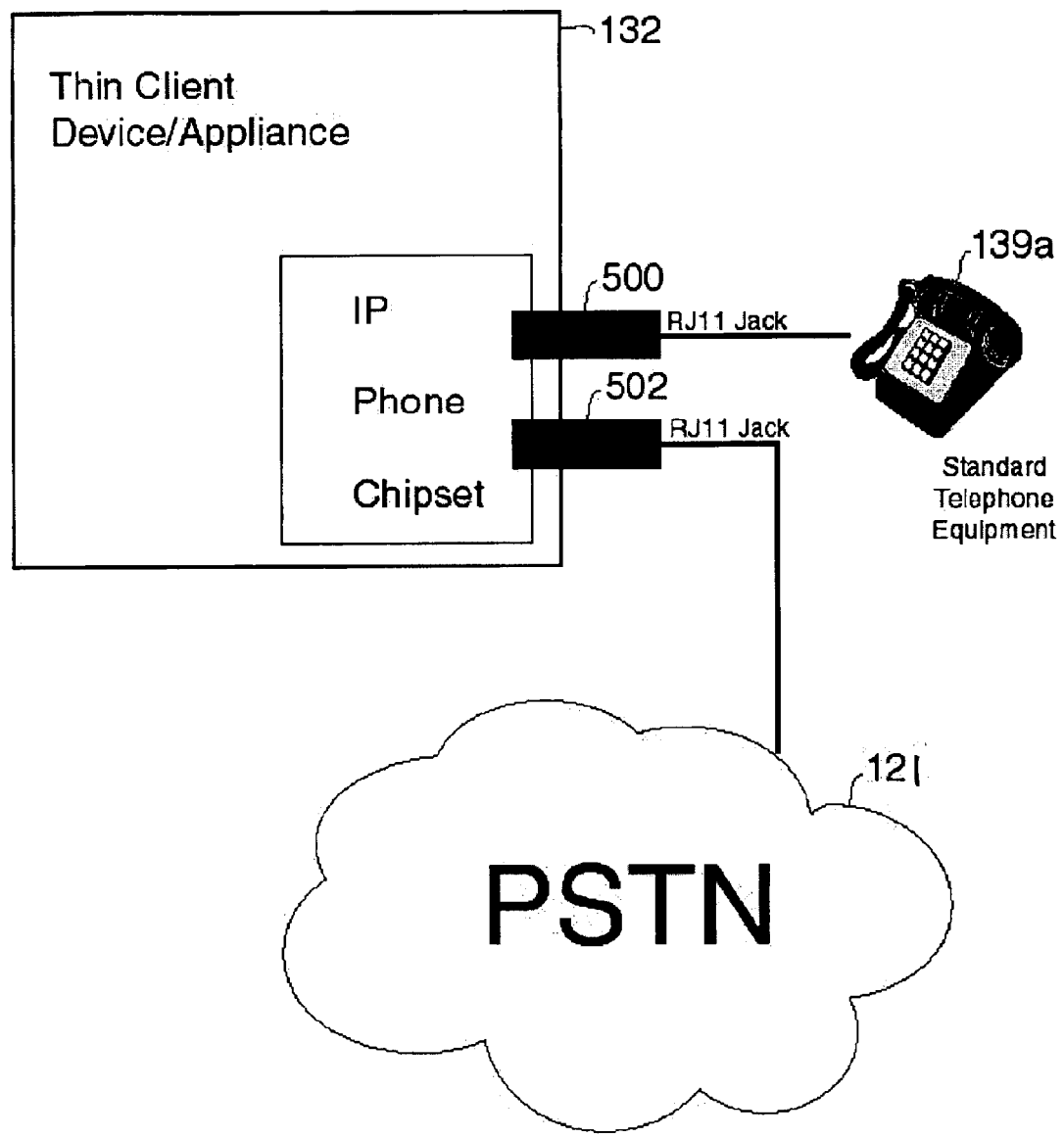
FIG. 5 is a block diagram showing an exemplary telephone interface according to the invention.

FIG. 5 is a block diagram showing an exemplary telephone interface that may be used in the system. Appliance 132 offers users the ability to use the Internet to place long distance telephone calls worldwide with the same ease of use as a standard household telephone at a substantial savings over conventional long distance service. The exemplary Appliance 132 includes an IP telephone chipset 322, which may be a DSP chipset or "Internet PhoneJACK™" full-duplex audio card from Quicknet Technologies, Inc., San Francisco, Calif. Alternatively, equivalent devices from Dialogic or Brooktrout corporations may be used. The IP phone chipset 322 is developed specifically to carry voice over the Internet at the highest possible quality. The IP phone chipset may be used in combination with Internet Telephone software (e.g., "NetMeeting" from Microsoft of Redmond, Wash. and "Internet Phone software" from VocalTec of Fort Lee, N.J.) to make and receive voice calls over the Internet. Using a software program such as Net2Phone or the equivalent, the user can make calls from the appliance 132 (or PC 141) to a normal telephone 139c (FIG. 1). The IP phone chipset 322 addresses the issues specific to Internet telephone calls (For example: echo cancellation, data compression, simultaneous two-way conversations and the ability to use a standard analog telephone connected via RJ-11 jack 500.).

The IP phone chipset 322 performs the telephone functions within the client 132, 141a. It listens to the telephone port 500. If the user picks-up the phone, the chipset 322 produces an artificial dial tone and presents the dial tone to the user. The telephone chipset 322 detects a telephone number being entered using a device connected to or contained in the client 132, 141a. The device may be a telephone keypad, a keyboard or a voice recognition system. The telephone connection to a destination is established by way of the client and the server.

When the user punches the DTMF keys on the phone, the chipset 322 dials out, by way of an RJ-11 jack 502 on the client 132, 141a which connects to a wall mounted RJ-11 jack (not shown). If a caller uses Internet telephone (e.g., 142a) to call the user (e.g., on phone 139a), chipset 322 rings, and the user can pick up the telephone receiver and answer. Integration of the telephone into the client 132, 141a provides enhanced functionality. For example, the user can launch a contact manager program and select a telephone number to call. Upon selection of the number using the software, the chipset 322 dials the number.

In the case of an outgoing call, the telephone application 408 determines whether the telephone number that is entered is a long-distance number. If the telephone number is a long-distance number, then the IP Phone chipset 322 and the device drivers 602 automatically establish a long-distance telephone connection between the telephone 139a and a destination telephone (e.g., 142d) having the detected telephone number, by way of the client 132, 141a, the server 202 and the Internet 110. If the recipient does not have an Internet phone, then the call is routed to a public switched telephone network (PSTN) 121 by way of a local hopoff 120 (which may be located at the facility of a telecommunications company. The call then rings on a standard telephone (e.g., 139c).

Local calls may be made directly through the PSTN, by way of a telephone that is not connected to the client 132, 141a. Alternatively, the system may also provide local telephone connectivity. An advantage of receiving both local and long distance service by way of the IP Phone chipset is that the caller could keep the telephone 139a plugged into the device 132 all the time, and would not need to remove the telephone from the device to make a local call. If local service is provided, and the user dials a local telephone number, then the IP Phone chipset 322 and the device drivers 602 automatically establish a telephone connection between the telephone 139a and a destination 139c having the detected telephone number, by way of the client 132, 141a, the server 202 and a PSTN 121.

If the caller is on another Internet phone (e.g., 142a), the caller can simply dial the user's Internet ID number, and the call rings on the Internet phone chipset 322. In a variation of the exemplary embodiment, the capability to provide incoming telephone service from a regular telephone 139c via the Internet may be provided. Local Internet hop-on points (not shown) may be provided, so that remote long distance callers could dial (from a regular telephone 139c) local numbers to connect to a client 132, 141a over the Internet. For example, a local hop-on point may be provided in New York City. Someone in New York would dial a local New York City number, and an automated attendant would answer and request the ID number of the user the caller wishes to talk to. Once the caller enters the users ID number, a call is automatically placed over the Internet to the destination client 132, 14la The caller is still getting charged the local telephone rate, because she is calling a local number. The inbound call option can be implemented by adding a bank of inbound lines connected to an interactive voice response (IVR) system, at the local hop-on point, which may be physically located at the local telephone company.

Preferably, the user is charged a nominal per-minute fee for Internet telephone usage that is substantially less than prevailing long distance telephone charges available from conventional long distance carriers.

Figure 6:
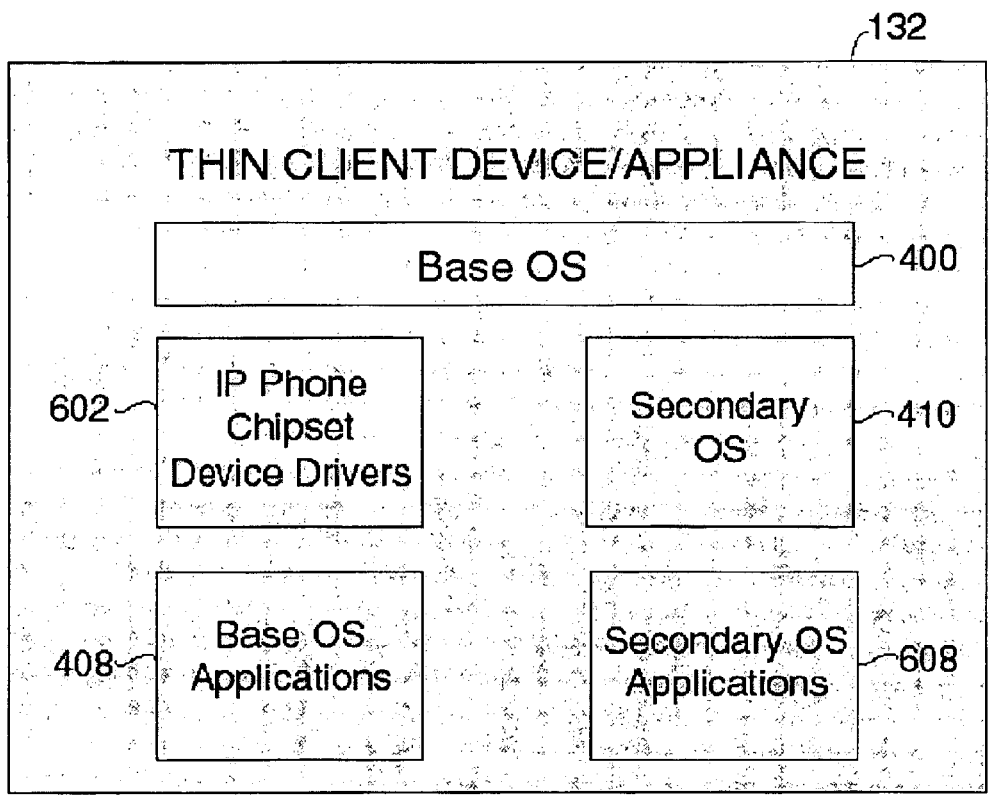
FIG. 6 is a block diagram showing an Internet telephone software configuration in the appliance of FIG. 3.

FIG. 6 is a block diagram of the OS and application software architecture for supporting the Internet telephone operation concurrently with other software functions. The base OS 400 may be Linux. One or more secondary OS's 410 may operate on top of the base OS 400, and secondary OS applications 608 may run on top of the secondary OS. A group of base OS applications 408 run in the native base OS environment.

One of the major base OS applications 408 may be VMware™ software, sold by VMware, Inc. of Palo Alto, Calif., and discussed below with reference to FIG. 9. VMware™ allows the secondary OS's 410 operate concurrently on top of the base OS 400. An equivalent program providing virtual machine capability may also be used.

Applications that should run in the base OS environment 400 may include applications that would cause great inconvenience if interrupted. For example, the telephone control application could run in the base OS environment, including the IP phone chipset drivers 602 and any applications (e.g., VocalTec Internet Phone software). Then, the telephone application would not be affected by any disruption (e.g., abnormal termination of a secondary OS application 608) that causes a reboot or reset of a secondary OS 410. Another example of a base OS application 408 is a program for controlling an "intelligent house," which may operate lights, heating, air conditioning, humidity, a security system, and the like.

As an alternative, any software that would cause inconvenience if interrupted may be run in its own virtual machine, and appear in a separate window. For example, Microsoft Netmeeting™ or other telephony application may be run on its own virtual machine. Because each virtual machine is protected from any disruption in one of the other virtual machines, system integrity is provided.

Typical secondary OS applications that would be run in the secondary OS environment 410 may include, but are not limited to word processing, databases, spreadsheets, financial software, graphics software and other productivity related applications.

The system architecture permits a user to have multiple profiles, with potentially different OS and/or applications in each profile. The user has the option to select a profile when the client is started up, and to change from a first profile to a second profile afterwards.

Figure 7A:
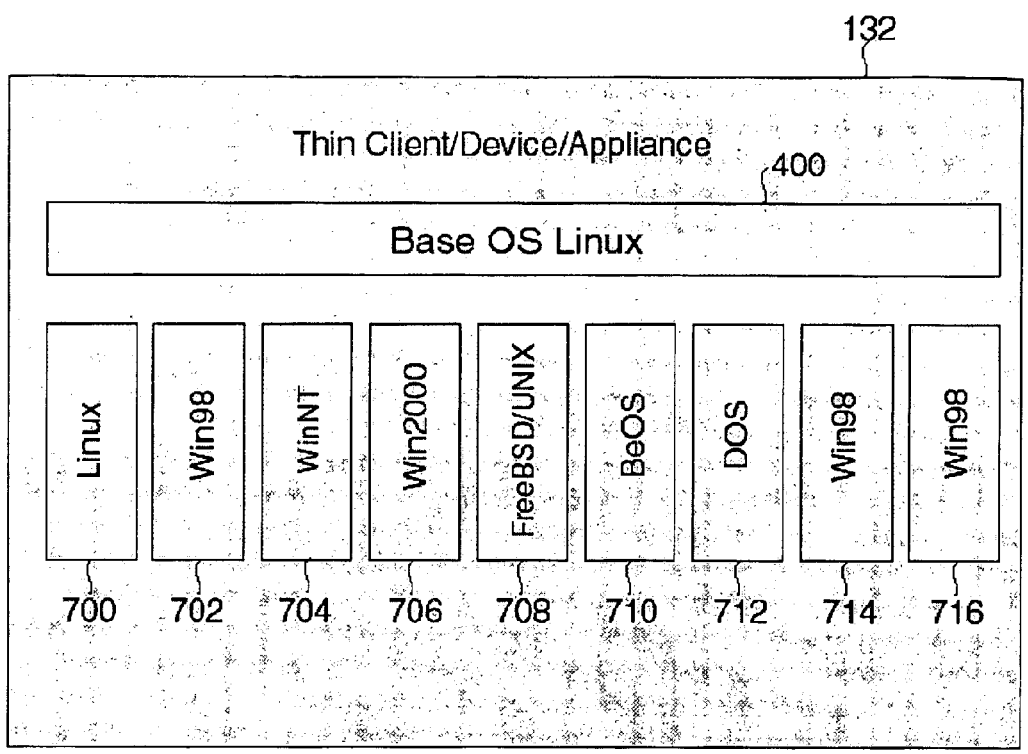
FIG. 7A is a block diagram showing an exemplary configuration of base and secondary operating systems in the appliance of FIG. 3.
Figure 7B:
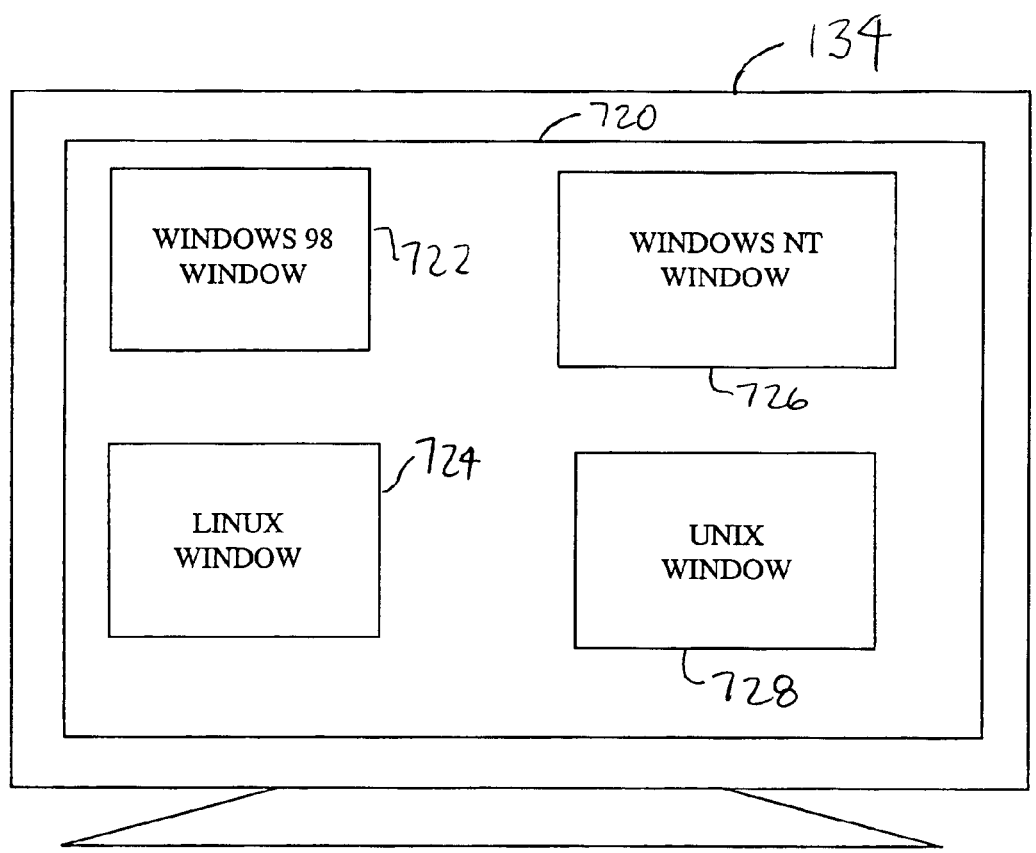
FIG. 7B is an exemplary display including a plurality of windows running respective operating systems, in the monitor shown in FIG. 1A.

FIG. 7A is a block diagram showing operating system concurrency in one of the clients 132, 141a. The base OS 400 may be Linux. The secondary OS may be the same type of OS (e.g., Linux) as the base OS, or the secondary OS may be any other operating system capable of running as a guest on top of Linux. These may include, but are not limited to, a guest Linux OS, Windows 98 702, Windows NT 704, Windows 2000 706, Free BSD/Unix 708, BeOS 710, and DOS 712. Further, there may be multiple instantiations of one of the secondary operating systems. For example, FIG. 7A shows three instantiations of Windows 98 running 702, 714 and 716. FIG. 7B shows how multiple OS's may be displayed in respective windows 722–728 on a display 720.

As mentioned above, the client device may be a computer 141a. To access the service using the computer 141a, a copy of a boot OS is used to start up the client 141a. The boot OS may be stored on a floppy disk, or on a boot PROM 810, which may be installed on the network card 808. The choice of whether to use a floppy disk or a boot PROM largely depends on whether the owner of computer 141a wishes to alter the hardware and/or software configuration of computer 141a. At least three options are available. These three options may use either the hard drive 800 or RAM 302.

In the first option, the floppy disk is used to load the boot OS. The boot OS and the base OS 400 operate in the same manner described above with reference to appliance 132, storing all data in RAM 302 or on the user storage server 208. The hard drive of the computer 141 is not used at all in this mode of operation. The configuration of the RAM under the first option is the same as the RAM configuration of appliance 132 shown in FIG. 4.

The first optional method of operation described above allows the user to maintain his or her previous software and data configuration intact on the hard drive of computer 141. Under this option, nothing is written to the hard drive. When the power switch of the computer 141 is turned off, the boot image in RAM disappears. If the boot floppy disk is removed from the floppy drive, then the computer can be restarted from its hard drive, and the original configuration of software and data is still present.

The first option described above is advantageous for a user that has not licensed any software previously. The user can merely pay the system owner for the software by the minute or hour, on a pay-as-you-go basis, as it is needed.

Figure 8:
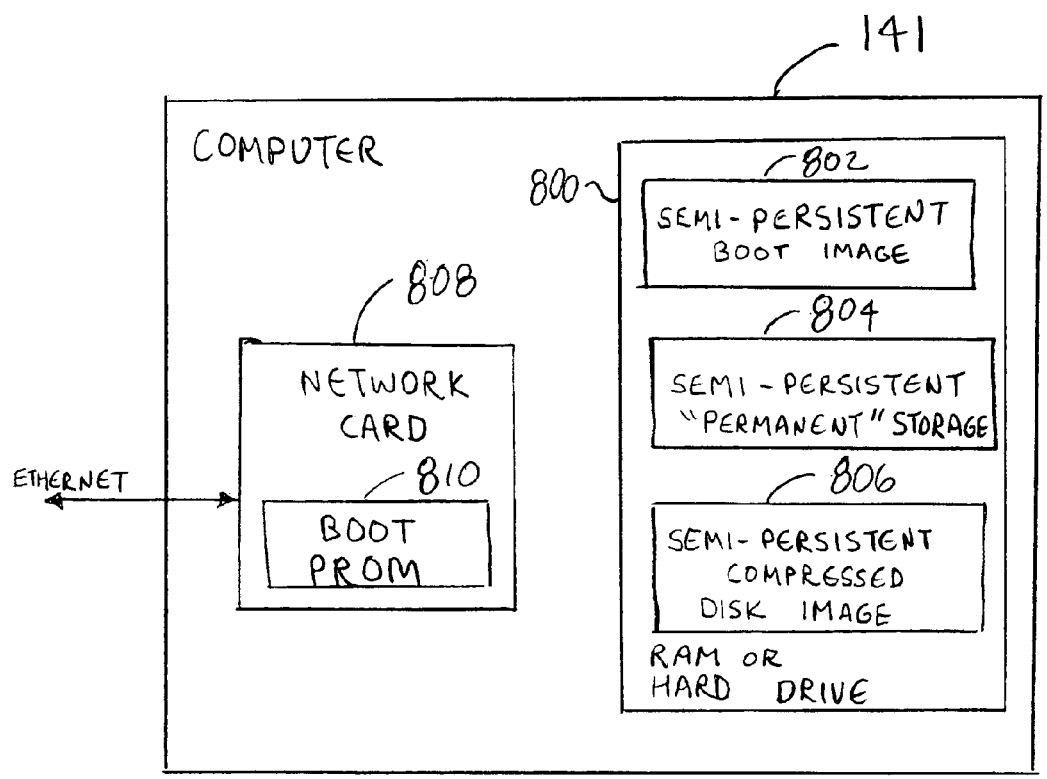
FIG. 8 is a block diagram showing the software configuration of the device of FIG. 3.

A second option for accessing the system from a computer 141 involves use of the hard drive 800, shown in FIG. 8. By making a selection on a menu, the user can choose to have a semi-persistent boot image 802, semi-persistent permanent storage 804 and semi-persistent compressed disk image 806 stored locally on the user's hard drive. If this option is selected, the user is presented a warning that the hard drive will be reformatted and any data thereon will be lost. If the user chooses to continue, then the hard drive is reformatted, and the initial configuration server downloads the compressed disk image 806 onto the hard drive of the computer 141. The files are decompressed and written into the semi-persistent boot image 802 on the computer. Data generated during use are stored in the semi-persistent permanent storage 804.

FIG. 8 is a block diagram showing an implementation of a personal computer 141 (e.g., desktop, laptop or the like) when the second option is exercised. The computer 141 can perform all of the functions of the appliance 132, but can take advantage of the hard drive.

When the initial connection is made between the computer 141 and the initial configuration server 204, a compressed image is downloaded by the server into the semi-persistent compressed disk image 806. This semi-persistent compressed disk image 806 remains in hard drive 800 when the computer is shut down. Further, if a portion of the hard drive storing files in the semi-persistent boot image 802 becomes corrupted, it is possible to regenerate the boot image from the local semi-persistent compressed disk image 806 without any further download. Alternatively, following either a catastrophic failure or planned replacement of the hard drive, the entire semi-persistent compressed disk image 806 and semi-persistent permanent storage 804 are automatically downloaded from the server farm 100, regional server 122 or local server 140, and the entire semi-persistent boot image 802 is automatically regenerated the next time the user starts up the client 141. Thus, the term "semi-persistent" indicates that the files and data are automatically retrievable, even if the hard drive is lost or replaced, or the user moves on to another computer. Thus, all data are more securely protected than they would be if merely stored on a hard drive.

Preferably, whenever the user logs in, a checksum or code in the semi-persistent compressed disk image is interrogated by the initial configuration server 204, to determine whether the client 141 has the latest version of the compressed image. If the latest version of the compressed image already resides in the semi-persistent compressed disk image 806, then there is no download of software from the server 204 to the computer 141. If the computer 141 contains an older version of the compressed disk image, a new compressed disk image is automatically downloaded from the initial configuration server 204 to the computer. Alternatively, the user may be presented with a choice of either (1) continuing to run with the older version or (2) initiate a download of the updated versions of the software.

Another portion of the hard drive 800 is used for semi-persistent user storage 804. All data files and documents can be stored locally in the semi-persistent permanent storage 804, using a portion of the hard drive 800 as a storage drive. Whenever the computer is turned on, these data are available for use by the user's programs.

Because the program files and data are stored on the hard drive, there is no need to download the image upon subsequent startups, unless there is a new version of the software available on the server. Thus, upon powering up the computer, the computer is automatically connected to the initial configuration server 204, but the user is only prompted to download software if there is a new version available. The user's data are stored in permanent storage 804, and backed up automatically in user storage server 208. In general, any time the user connects to the system or changes his or her user profile, the initial configuration server 204 interrogates the compressed disk image 806 to determine whether the server image differs from the client image (in which case, an update can be downloaded, either automatically, or upon confirmation by the user.)

An important aspect of using the second option is that, even though software and data are stored locally on the hard drive 800, the user still logs into server 200 to use the client 141. This allows the server 200 to perform authentication and control tokening, even though the client 141 has copies of the software program files. This also allows the system to automatically backup the user data files stored in the semi-persistent "permanent"storage 804 during each session. Thus, the user still obtains the advantage of being able to access his or her data from any other client 132, 141 that has access to the server 200. If the user accesses his or her data while away from home or work, the user is assured that the updated data are backed up on the user storage server 208; the next time the user logs on at home or work, the most up-to-date data are downloaded from server 208 to the user's primary appliance 132 or computer 141.

The second option may be desirable for a user having a new computer, or a user that has backed up all data files on his or her hard drive and is switching over to the service. Also, if the user already has licensed the software they wish to use, the user can save money by using the second method—the user would not have to pay an hourly rate for any previously licensed software under the second method. The license/accounting server 218 that performs billing functions recognizes any software licenses the user may have purchased, whether purchased elsewhere prior to joining the service, or purchased from the system owner after joining the service. If the second option is used, and the user downloads a new version of a previously owned application, the system automatically charges the user's account for the cost of a license for the new version.

Because the second option involves copying OS's and applications onto the user's hard drive, it is anticipated that the pay-as-you-go leasing option may not be available from all software vendors. Some software vendors may require purchase of a regular license for each program used under the second option. Nevertheless, because the authentication server 216 retains a software token (a critical portion of the program) or copy protection key that is not stored on the client hard drive 800, client access can be controlled, and logged by the servers 216 and 218 (even when the local hard drive 800 is used). That is, even though most of the program files are stored locally on the client 141, the programs cannot be executed without first logging into the server 200 and obtaining the token to operate the software. The server 218 can log the time that the client 141 has the token, permitting use of the pay-as-you-go licensing option. Thus, it is possible to track the client's use of locally stored software from the server 218.

The third option may be used by any computer 141 (e.g., a desktop or laptop) having a browser and an Internet connection. The browser is used to go to the web site of the service provider, to connect to one of the special purpose backend servers 202. The session is run on the backend server 202, with all output displayed on the browser of the client 141. That is, processing is performed on the server 202, and the computer 141 acts like a display terminal. By this method, the user can run every session and virtual system that he or she would run locally under the first or second methods described above, although performance may differ. Thus, within the browser, the user could have a plurality of windows, each running a respectively different secondary OS. Further, the client 141 can remotely boot multiple operating systems concurrently and display the multiple OS's on the client 141, by way of the Internet browser. The entire set of multiple sessions are concurrently executed remotely and displayed locally via the browser.

The purpose of this third option is to enable a person to interact with his or her personal desktop from locations that are not set up to use the service, but do provide Internet connectivity.

In the first and second options, when connected to the server 200, the processing is split between the local device and the server farm 100, with most of the processing done locally. In the third option, all the processing is done at the server farm 100, and the local client 132, 141a only handles display and user input.

A user can either run a small program or use a Java capable browser on a computer connected to the Internet. The user then connects to a session on the server 200 that is his or her own personal desktop.

This option allows the user to disconnect from a computer with his or her program(s) still running and reconnect later, everything will be exactly as the user left it.

Figure 9:
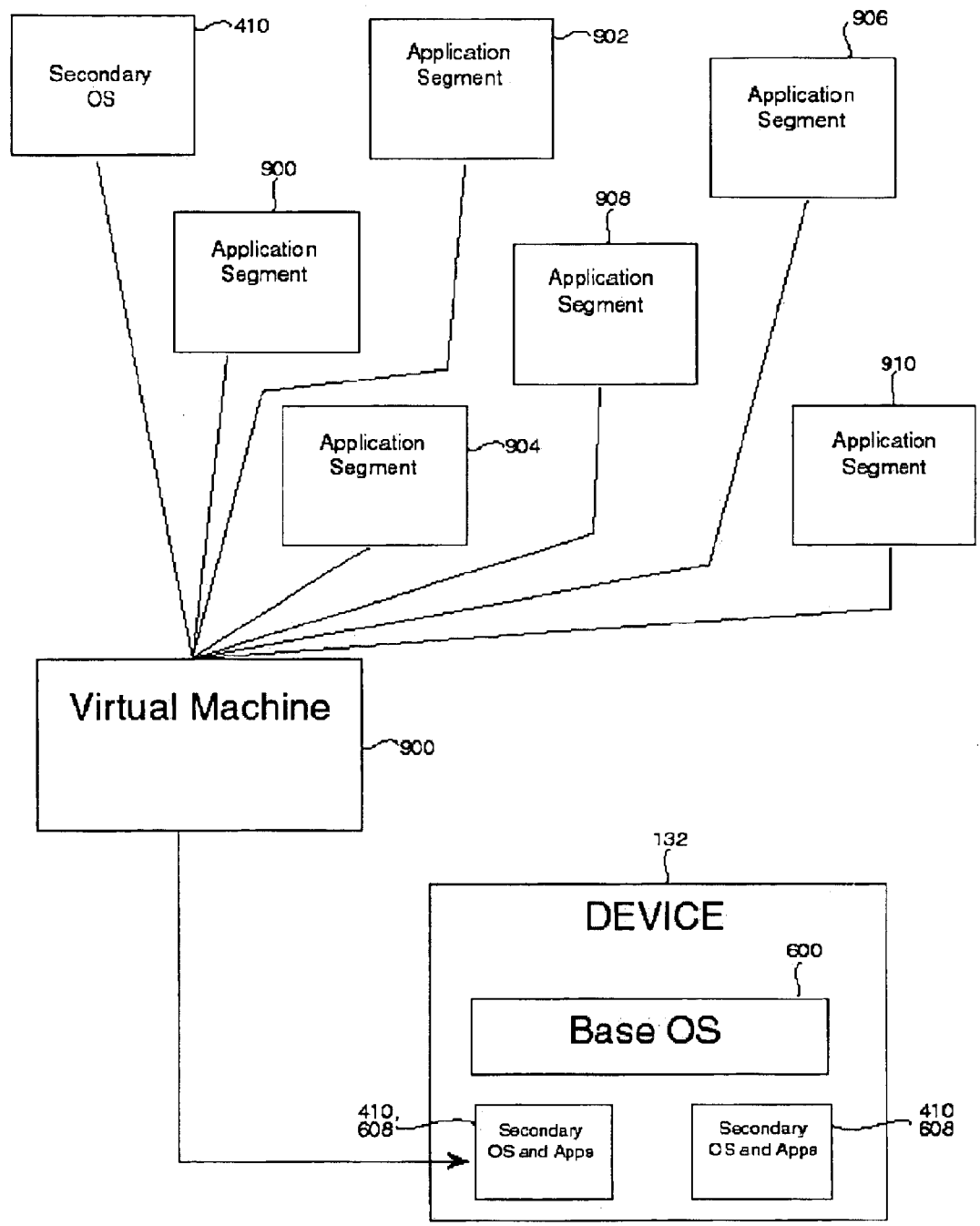
FIG. 9 is a block diagram showing remote profiling in the system of FIGS. 1A and 1B.

FIG. 9 is a diagram showing the exemplary implementation of a virtual machine approach for providing multiple concurrent OS's in the client 132, 141a. In the exemplary embodiment, VMware™ software (sold by VMware Inc. of Palo Alto, Calif.) operates as a base OS application 408.

VMware™ is a software application that runs multiple virtual computers concurrently on a single appliance 132 (or PC 141) without partitioning or rebooting. VMware makes secondary OS's 410 transparently available, each running in a window or full-screen, along side base OS applications 408 from the "host operating system." VMware provides a virtual machine memory and disk space.

VMware™ is a thin software layer that allows users to: (1) Run multiple secondary OS's 410 concurrently on a single PC-without repartitioning or rebooting; (2) Isolate and protect each operating environment, and the applications and data that are running in it; (3) Interoperate among each of these secondary OS's 410, including full networking, device and file sharing, and cut-and-paste capabilities; (4) Undo changes made in a given session; and encapsulate and manipulate each operating environment, and (5) have the ability to roll back and restart an application, or move an environment among differently configured machines.

Users can run multiple secondary OS's 410 unmodified, each in separate virtual machines. Each virtual machine runs as a fully protected session, providing the secondary OS's 410 and secondary OS applications 608 with fault and security isolation from the rest of the machine. In the event of a secondary OS hang or crash, the user may simply shut down the virtual machine and restart it, without impacting the rest of the system. Users may also choose to undo changes they have made in a given virtual machine session.

As shown in FIG. 9, each virtual machine 900 can include a respective secondary OS 410. Each secondary OS 410 may support a plurality of secondary OS application segments 900–910.

In the exemplary embodiment, the user's desktop includes a respectively different icon for each profile the user has. By double-clicking on one of the icons, the user can start another virtual machine 900 and launch a secondary OS 410. A plurality of application segments 900–910 are merged into a set of files and imposed on the secondary OS 410 inside the virtual machine 900. The configuration of the virtual machine 900 is performed on-the-fly. Rather than running installation programs to install each secondary OS application 608, the list of applications in the profile is checked. An on-the-fly script is generated for each profile. All of the program files needed to launch the program are merged together with registry update information and configuration file updates, with each file in the appropriate location to make the secondary OS applications 608 work together. The script downloads the program files, sets up the OS and applications, and launches the virtual machines. The merged set of program and configuration files is fed to the virtual machine.

By the above method, multiple OS's and/or applications are launched for concurrent operation, transparently. To the user, it appears as though a plurality of applications are launched in respective windows within a single operating system.

Figure 10:
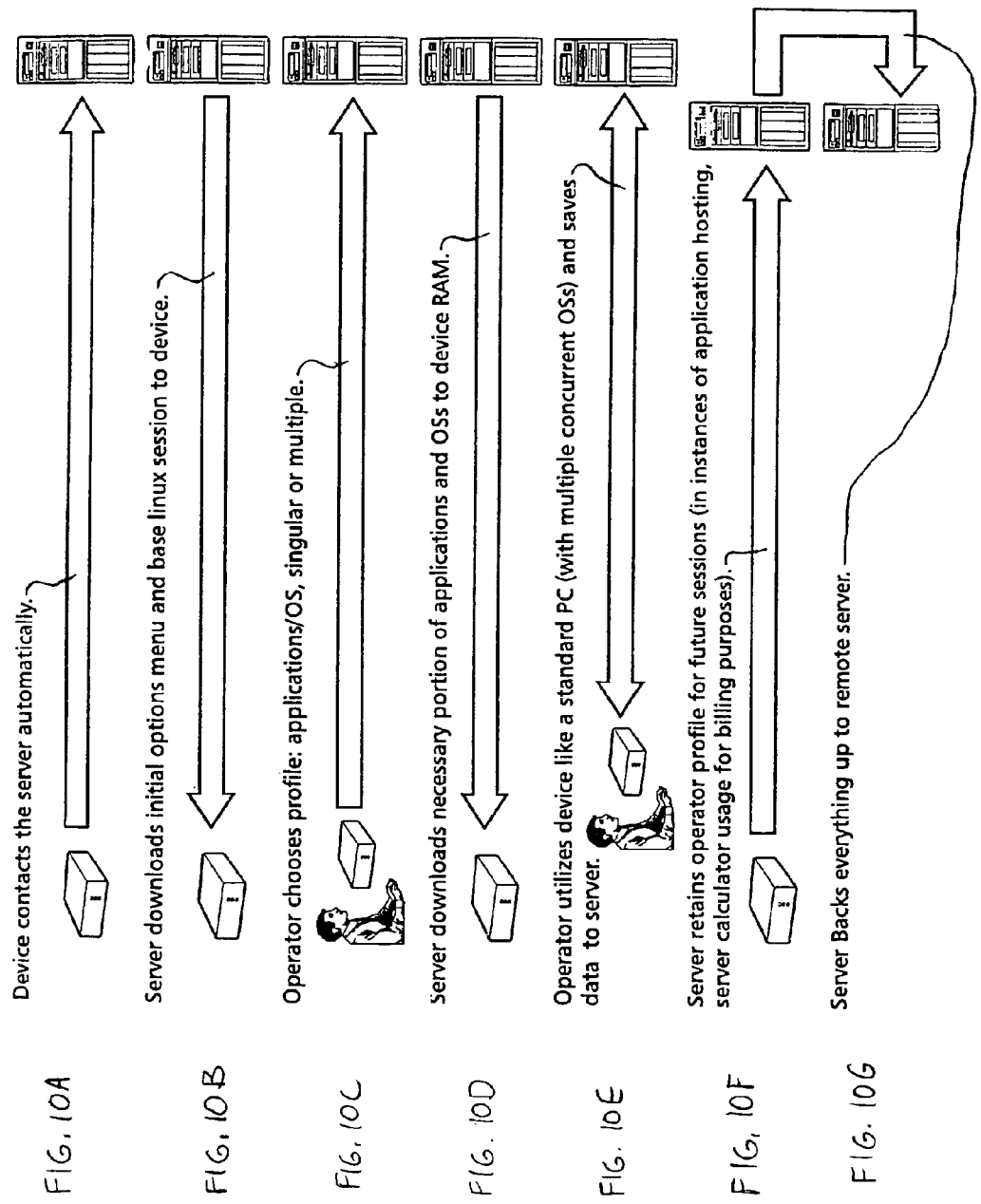
FIGS. 10A–10G are diagrams showing activities performed during a user session in the system shown in FIGS. 1A and 1B.

FIGS. 10A through 10G show a typical sequence of method steps for using the exemplary networked computer system. In FIG. 10A, when the the device 132 is powered on, the boot operating system is loaded in the client. The boot OS is a partial version of a Linux OS having sufficient capability to establish a connection between the client 132 and the server 140. The boot OS automatically selects a connection method corresponding to the type of link connecting the client 132, 141a to the initial configuration server 204, and the client 132, 141a automatically contacts the server 204. In FIG. 10B, the server 204 downloads an initial options menu, from which the user can select a profile. Each profile corresponds to a respectively different configuration of OS and application software. The profile may also specify that multiple OS's are automatically launched/spawned at the beginning of the session, and run concurrently in respective windows. The server 204 downloads at least a first portion of a base OS 400 (e.g., Linux) from the server to the client 132, 141a. The first portion of the base OS 400 includes a plurality of OS files that are not stored locally in the client 132, 141a before the downloading.

In FIG. 10C, the user selects one of the profiles. In FIG. 10D, the server 204 downloads into the client's RAM 302 a first portion of each application and OS in the selected profile, potentially including respective first portions of multiple OS's. The first portion of each OS or application includes at least the necessary program files to launch the OS or application, and may include additional frequently-used files. The base OS 400 is automatically launched in the client 132, 141a. The base OS 400 automatically spawns any secondary OS 410 specified in the profile, so that the base and secondary OS's run concurrently in the client 132, 141a. Secondary OS's may include, but are not limited to, one or more of the following: Linux, Windows 95, Windows 98, Windows NT, Windows 2000, Unix, BeOS, and DOS. In FIG. 10E, the user carries out his or her session, performing computing locally on the appliance 132, and saving work to the user storage server 208. In FIG. 10F, the initial configuration server 204 retains a (possibly updated) profile for the user for use in future sessions. The user's connect time is recorded in records for billing purposes, as described below with reference to FIG. 15. In FIG. 10G, the user storage server 208 creates a backup copy of all user data and files.

Figure 11:
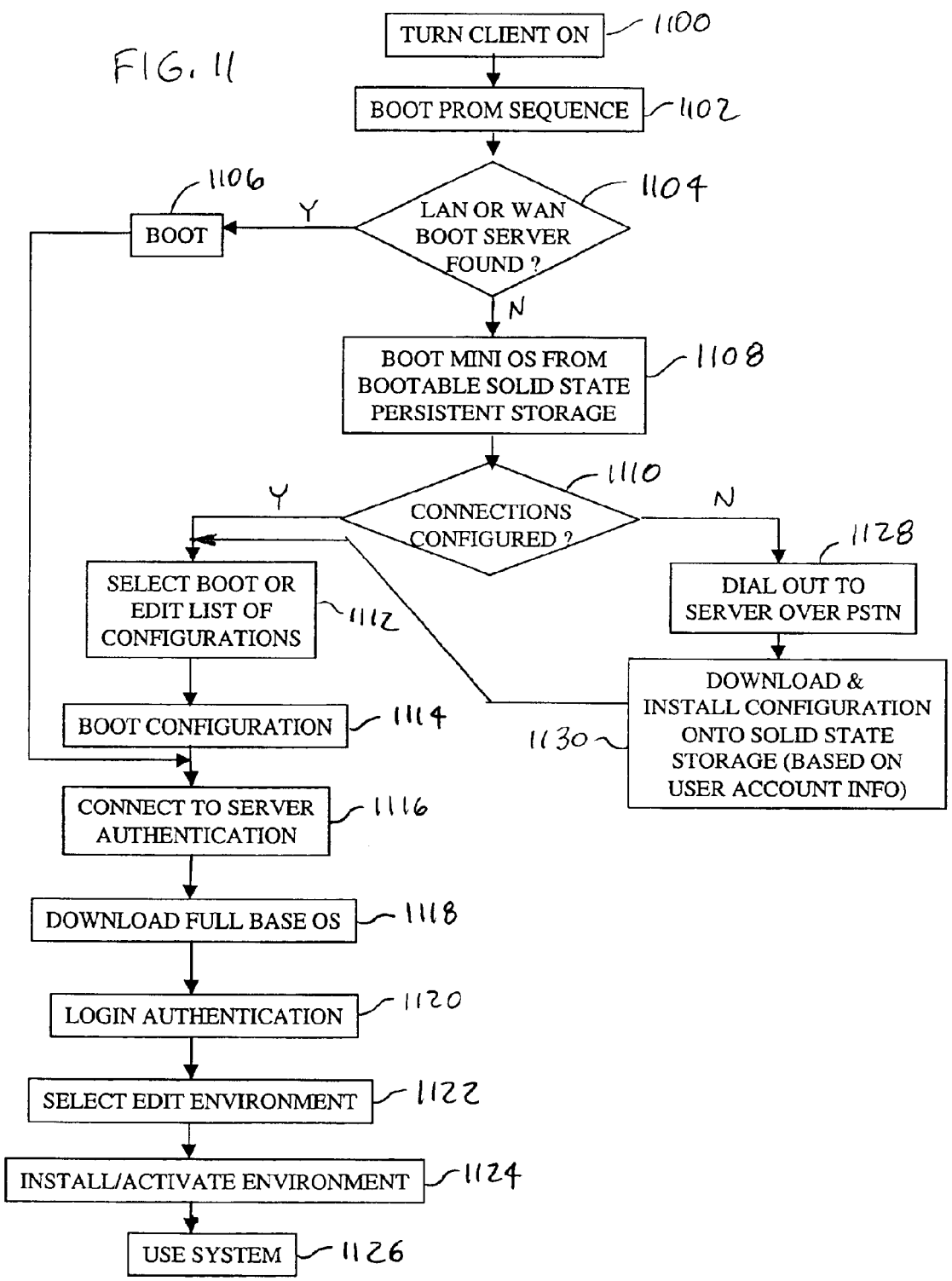
FIG. 11 is a flow chart diagram showing a method for configuring the appliance shown in FIGS. 1A and 1B.

FIG. 11 is a flow chart diagram showing in greater detail the process for initiating a session in the system. An individual or company contracts for access to the apparatus and method. The initial contractual agreement may be set up on the telephone with a sales associate of the system. Information is provided, such as street address, credit card number, and available media for connections (e.g., XYZ Cable Co.). The appliance 132 is given an account code with its method of connection stored on the central network server 200. This device 132 is then connected to a LAN/WAN or to the Internet (via cable, DSL, satellite, etc). The device contains a Boot ROM that is utilized to configure itself remotely.

At step 1100, the user turns on the client appliance 132 or PC 141a. At step 1102, the boot OS is loaded from a boot PROM (in the appliance 132) or a flash memory 304 or floppy disk (in the computer 141a).

At step 1104, when the boot OS is executed for the first time, the boot OS searches for a connection to a LAN or WAN boot server 140.

If the boot server 140 is found, then at step 1106, the client 132 or 141a is booted from the boot server 140 by downloading a boot OS from boot server 140 to client 132, 141a. Thus, in a large local area network migrating to the system, instead of physically installing the boot PROM 336 in each client 132 or 141a, the boot OS can be downloaded from a single server 140.

If the client has no connection to a LAN or WAN boot server 140, then at step 1108, the appliance 132 loads and executes the boot OS from boot PROM 336. Alternatively, if the client is a computer 141a, and the option of using the computer hard drive has been chosen, then a version of the base OS may be previously stored on the hard drive of the computer 141a.

At step 1110, if there is no connection configured (for example, if the client is an appliance 132 connecting to the network for the first time, and there is no base OS in the client main memory 302, then at step 1128, the boot OS dials a number to the central server 200 over the (PSTN) public switched telephone network 121 via the (RJ-11) standard telephone connection 502. The configuration is downloaded into an onboard Flash EEPROM 304 that is to be used to boot the computer with the correct configuration thereafter. The server 204 downloads the user account registration information and flashes it into the EEPROM 304, so that when the user disconnects, the very next time the client is started, the EEPROM contains code to connect through the specified medium. This completes the connection of the hardware to the network.

At step 1130, the initial configuration server 204 downloads the OS(s) and applications in the user's profile to the main memory 302 of the client 132, 141a. The profile is based on the user account information. If the user account information has never been entered (i.e., if this is a new user account), then the user is prompted for the account information before performing the download. The account information identifies one or more profiles defining software configurations, method of payment, and debit or credit card or bank account information to secure payment.

When the software corresponding to the requested profile is downloaded, then step 1112 is executed. Step 1112 is also performed subsequent to the first time the user connects to the system, following execution of step 1110, with the connection configured. At step 1112, the user selects either booting the base OS or editing the profile list of software. Following this step, the base OS is booted in the client 132, 141a. At step 1116, the client connects to the authentication server 216. At step 1118, the full base OS is downloaded to the main memory 302 of client 132. At step 1120, login authentication is performed, either by prompting the user for a password, or using another authentication system, such as fingerprint, iris or voice recognition or use of an authentication card. Once authentication is complete, at step 1122, the user selects and/or edits the profile of the environment. At step 1124, the necessary application files are downloaded and the selected/edited environment is installed and activated in the client. At step 1126, the system is ready for use by the user.

Should the user change his or her connection medium to a new custom medium (e.g., a new cable company), it may be necessary to download new connection code. This is easily accomplished by connecting the client 132, 141a to a telephone line and following the initial boot sequence of FIG. 11. Once the code for a connection method is flashed into memory 304, it is not necessary to re-load that connection method code again until the user changes the connection medium again.

As an alternative, instead of connecting to the server farm 100 via telephone line, the user can copy the updated connection software from a working system. For example, a user who is preparing to change from cable company No. 1 to cable company No. 2 can download new connection software from the system while still using cable company No. 1. While logged into the system, the user enters a menu for adding connection software. The user is presented with a list of cable, satellite and DSL vendors for whom software is available. The software for cable company No. 2 is added to the flash memory 304 of the client 132, 141. If there is no connection code available for cable company No. 2, then the user can use the fallback procedure of connecting through the PSTN.

Optionally, any time the user starts the client 132, 141a, and the client is unable to complete a connection, instructions may be displayed, advising the user on the procedure to follow, depending on whether this is a new user account or a new connection method for an existing account.

Figure 12:
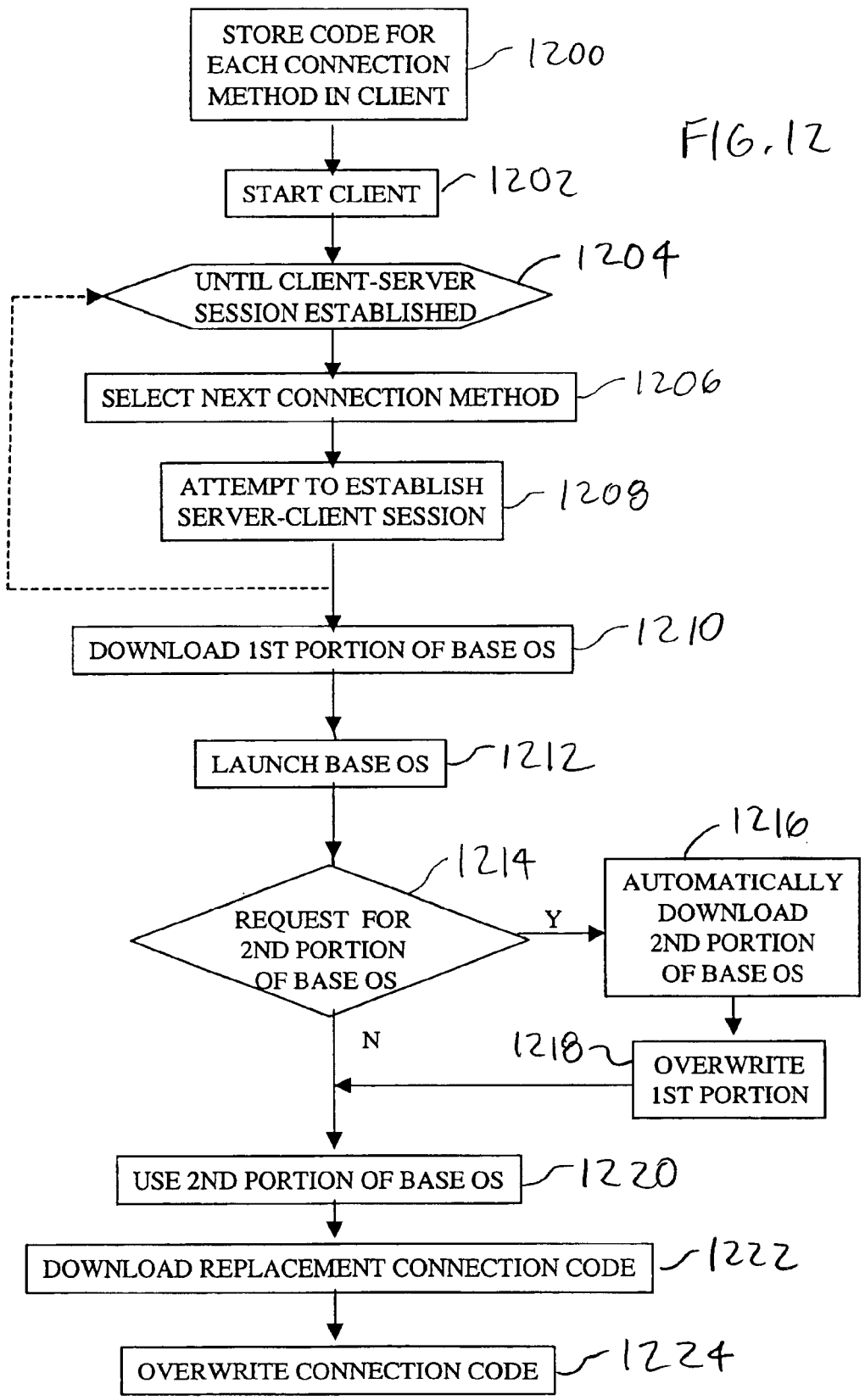
FIG. 12 is a flow chart diagram showing a method for forming a connection between the client and server of FIG. 1A, and downloading the base operating system to the client.

FIG. 12 is a flow chart diagram showing, in greater detail, the method of establishing the connection to the initial configuration server 204 and starting a session. At step 1200 computer code is stored for each of the first plurality of connection methods in a memory device in the client. Standard connection methods are included in the software in either flash memory 304 or boot PROM 336. Alternatively, if the very first connection between the client and server is performed via telephone connection, the standard high speed connection methods are downloaded during the first session. The connection methods include at least one of the group consisting of a local area network connection method, a wide area network connection method, and an Internet connection method.

At step 1202, the client is started with a boot operating system. At step 1204, a loop including steps 1206 and 1208 is executed to automatically establish a communications session corresponding to the type of connection between the server and the client. At step 1206, the next connection method is selected. At step 1208, the boot OS sequentially attempts to establish the communications session with the initial configuration server 204 using successive ones of the first plurality of connection methods. The boot OS identifies the type of connection between the server 204 and the client 132, 141a when the communications session is established successfully using one of the first plurality of connection methods.

At step 1210, the initial configuration server 204 downloads at least a first portion of a base operating system from the server to the client, containing the program files needed to launch the base OS 400, secondary OS 410, and applications 406, 408.

At step 1212, the client 132, 141a automatically launches the base OS 410.

In the exemplary embodiment, the main memory 302 of the client 132, 141a is used as a cache for OS files, program files and user data. Any request for an OS file, program file or data element that is present in the main memory 302 of client 132, 141a is satisfied by accessing the files or data resident in the client 132, 141a.

At step 1214, if a execution of software in the client 132, 141a results in a request for a second portion of the base OS 400, secondary OS 410, or application 406 or 408, the base OS 400 recognizes that the requested files or data must be retrieved from the server farm 100. The specific files or data may be contained in the OS server 210 for OS files, the application server 212 for application files, or the user storage server 208 for user data. In the case of an OS file, the second portion of the base operating system is automatically downloaded from the OS server 210 to the client.

At step 1218, the second portion of the base OS 400 may at least partially overwrite the first portion of the base operating system. Thus, the download may be limited to files and data that are missing from the client 132, 141a, or the download may also include replacement files for updated program code.

At step 1220, the client 132, 141a uses the second portion of the base OS 400.

Another aspect of the exemplary embodiment is the ability to update the code used for forming connections between the client 132, 141a and server 204. At step 1222, the method may include the step of downloading replacement computer code for a second plurality of connection methods. The second plurality of connection methods is at least partially different from the first plurality of connection methods stored in step 1200. At step 1224, the portion of the boot OS code used to connect to the server is overwritten with the replacement computer code. Thus, the system provides for dynamically changing the connection method (or medium) between sessions, and dynamic updating of the list of available connection methods during each session. Thus, if the user changes cable companies, the necessary communication interface software is installed.

The example described above with reference to FIG. 12 is not intended to limit the use of the caching concept in the system to data transmitted from the server farm 100 to the client 1322, 141. As noted above, the concepts of FIG. 12 may be used to download a missing program file to the client 132, 141 from any one of the following sources: OS server 210, application server 212, regional server 122 or local server 140. If the client 132, 141 is connected to a local server, then the link in the client RAM (where the missing file would be located) points to the local server. If the client 132, 141 is not connected to a local server 140, but is connected to a regional server, then the link in the client RAM (where the missing file would be located) points to the regional server. Similarly, local servers 140 are set up to try to access any missing file in a regional server 122 (if the local server is connected to a regional server).

Figure 13:
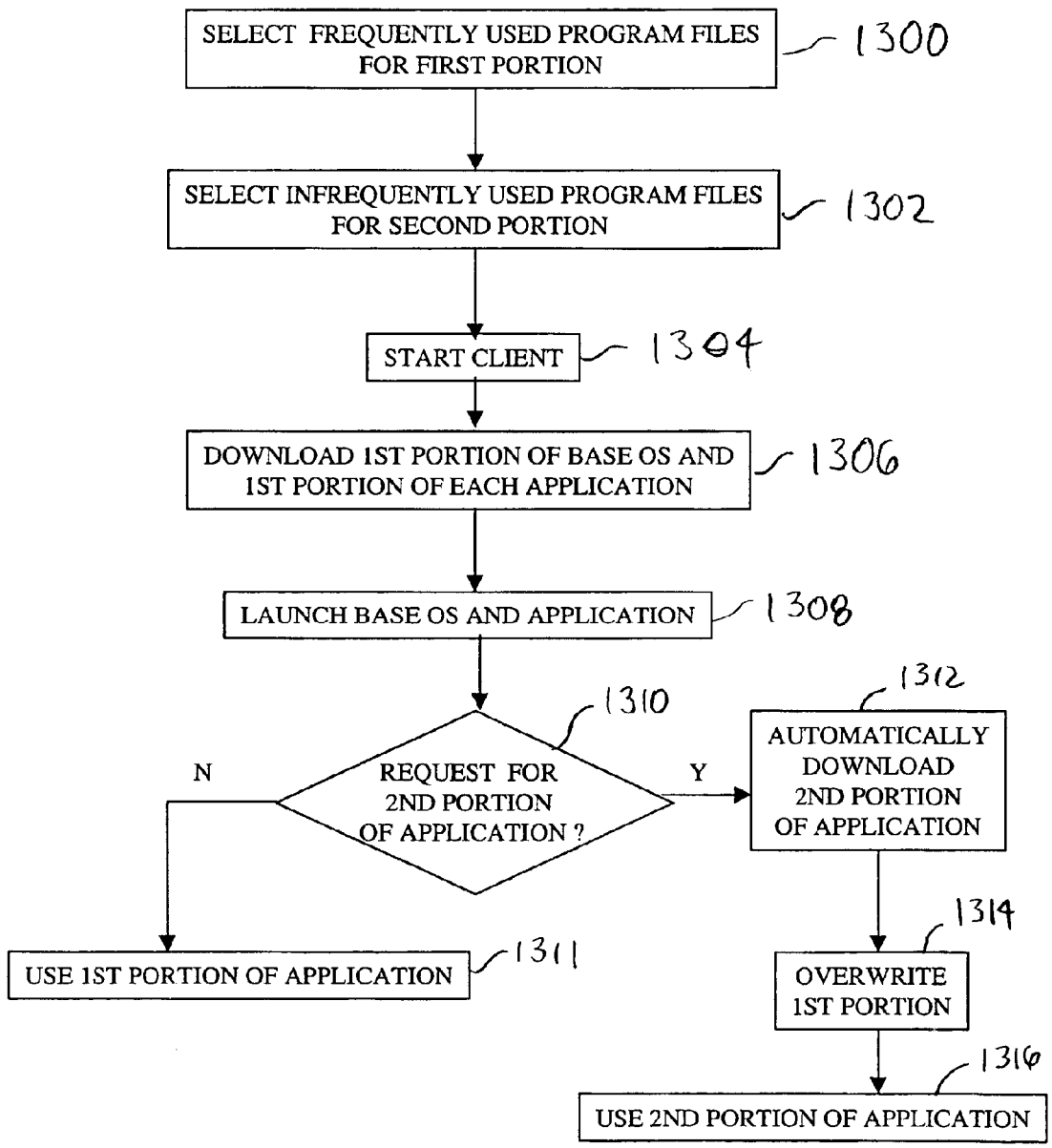
FIG. 13 is a flow chart diagram showing a method for configuring the application software in the appliance of FIG. 1A.

FIG. 13 shows how the caching concept is performed for application programs 406, 408. This allows a partial set of program files for an application to be used and launched locally, even though the application is only designed to operate with a complete set of program files stored locally.

At step 1300, for each application, a first plurality of files including those needed to launch the application and (optionally) other frequently used program files are selected for inclusion in the first portion of the application that is downloaded upon startup by a user having that application in his or her profile.

At step 1302, a second plurality of program files, including infrequently used program files not needed to launch the application, are assigned to the second portion of the application that is not downloaded upon startup. The second plurality of program files are not included in the first plurality of program files. Importantly, the application program may be a program that is designed to operate only with the first plurality of program files stored locally and the second plurality of program files stored locally; that is, the program may be designed to only operate with local program files.

At step 1304, the client 132, 141a is started. At step 1306, the initial configuration server 204 downloads the first portion of the application program from the server to the client 132, 141a.

At step 1308, the base OS 400 and application program 406, 408 are launched in the client 132, 141a, while the first portion of the application program is stored locally in the client, but the second portion of the application program is not stored locally in the client.

At step 1310, a determination is made as to whether one of the second plurality of program files is requested. At step 1311, any requests for program files that are included in the first plurality of program files are satisfied by using the copy of the program files stored locally in the client 132, 141a. Thus, the client's main memory 302 is used as a cache for the application program files.

If the client 132, 141a processes a request for one of the second plurality of program files., then at step 1312, at the location in RAM 302 where the requested file would be loaded, a link to the application server 212 is stored instead. This causes the request to be passed to the application server 212. The application server 212 automatically downloads at least one of the second plurality of program files from the server to the client. Preferably, the system is configured so that individual ones of the second plurality of program files are downloaded on an as-needed basis. This reduces the duration of the download, minimizes server traffic, and conserves memory space on the client 132, 141a.

Other methods may also be practiced for selecting which of the second plurality of program files to download upon a request for one of the second plurality of program files. For example, the program files in the second portion of the application may be grouped into subsets of the second plurality of files, such that the files in each subset are likely to be accessed within a short period of time of each other. When a program file in the second plurality of program files is requested, that requested program file and any other program files in the same subset are downloaded together. Another simple method of selecting files for download includes downloading a predetermined number of files that would be located near the requested file in RAM 302 once the files are copied into RAM 302. These techniques attempt to download files that are likely to be requested very soon, before the request occurs. By downloading some of the second plurality of files before they are actually requested, latency is reduced when they are subsequently requested.

Alternatively, it is possible to simply download all of the second plurality of program files when a first one of the second plurality of program files is requested. This may be practical with relatively small application programs, but may be less desirable for very large programs, because of the impact on download time, server traffic, and storage space.

At step 1316, once the files are downloaded, those of the second plurality of program files that are downloaded to the client are used.

Although the description above pertains to the execution flow for RAM caching of an application program, the method described above may also be applied to OS's, for example, the base or secondary OS's 410. In the case of an OS, a link to the OS server 210 is provided in the location in RAM 302 where an OS file from the second portion of the base OS would be stored. A request for that OS file accesses the link to the OS server 210 to download the file.

In typical use, the applications and OS's do not fill the client's RAM 302. If, however, the user's profile includes many large applications, and the client 132, 141a is operating for an extended period, it is possible that the client's RAM could be filled. In that case, to accommodate additional requests for program files that are stored on the server but not present in RAM 302, it is necessary to overwrite some of the files currently in memory. This can be accomplished by selecting the least-recently-used program files that are not needed for launching an OS or application program. The selected program files can be overwritten by the newly requested program files. If a request for one of these deleted program files occurs subsequently, the program files can be downloaded again when required.

Although FIG. 13 describes RAM caching with a simple one-hop connection between a client 132 and the server farm 100, a similar method is used when the client 132, 141 connects to the server farm 100 by way of a regional server 122 and/or a local server 140. For example, a user of client 141a (FIG. 11B) may execute a command in an application that causes reference to a program file not stored locally in client 141a. At the location in RAM of client 141a where the required program file would be stored locally is a link to a storage location in the local server 140 where the file is to be stored. If the required program file is not yet stored locally in the local server 140, then a further link is found at the storage location in server 140 where the requested program file would be stored locally. This further link points to a location in the regional server 122 where the required program file would be stored locally. If the required program file is not yet stored locally in the regional server 122, then an additional link is found at the storage location in server 122 where the requested program file would be stored locally. This additional link points to a location in the OS server 210 or application server 212 where the required program file is stored. The program file is downloaded from server 210 or 212 to the regional server 122; from the regional server 122 to the local server 140; and from local server 140 to client 141.

In a similar matter, if the client 132 is connected directly to the regional server 122 (FIG. 1A), without a local server 140, the request is routed up from the client 132, through the regional server 122 to the server farm 100, and the program file is routed down from the server farm 100 through the regional server 122 to the client.

Figure 14:
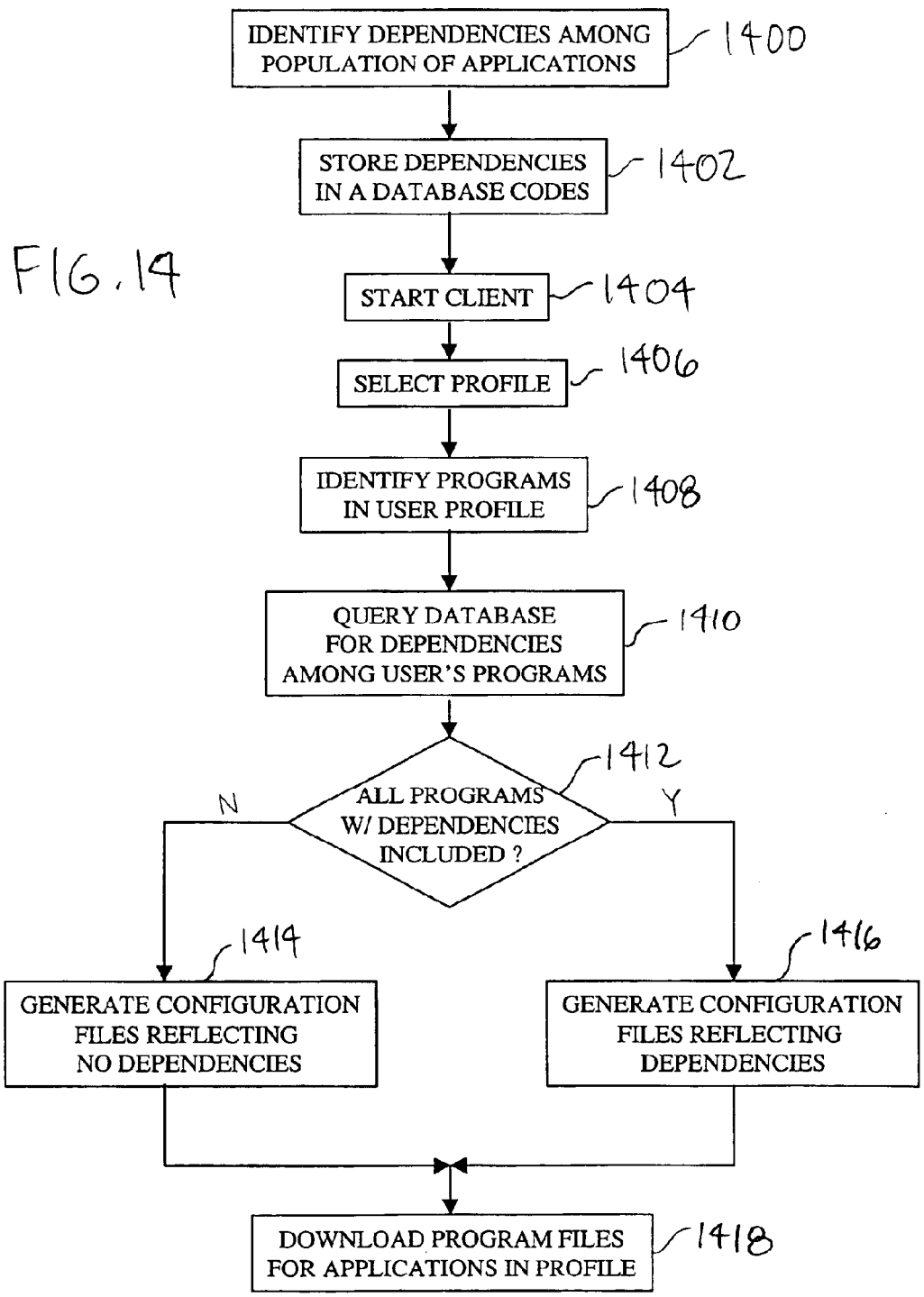
FIG. 14 is a flow chart diagram showing a method for generating configuration files for the clients shown in FIGS. 1A and 1B "on the fly" without running installation programs.

FIG. 14 shows a method for configuring computer programs on the client that is coupled to a server, according to another aspect of the exemplary embodiment. Programs are not "installed" in the sense of running installation programs locally to install program files, update the registry and load configuration files. Rather, a bootable disk image is assembled in the server, along with any configuration files and registry updates needed to run the program, and the image is downloaded to the client via the Internet, ready to run.

At step 1400, the initial configuration server 204 identifies dependencies among a population of computer programs.

At step 1402, the server 204 stores a plurality of codes in a database. Each code is associated with a respective dependency between at least two computer programs in the population of computer programs.

At step 1404, the client 132, 141a is started. At step 1406, the user of the client selects a profile.

At step 1408, the initial configuration server 204 identifies a first plurality of computer programs that are listed in a user profile associated with a user of the client 132, 141a. The first plurality of computer programs is associated with the user. The first plurality of computer programs is a subset of the population of computer programs stored on the application server 212.

At step 1410, the server 204 queries the database identifying dependencies among the population of computer programs that are stored on the application server 212. Any dependencies among the first plurality of computer programs are identified based on the query.

At step 1412, a determination is made whether all of the interdependent programs sharing a given dependency code are included in the user's profile. For example, the codes associated with each of the programs in the user's profile are checked. Each code is associated with a number of applications that have dependencies. If more than one (or all) of the applications having the same code are included in the user's profile, then the initial configuration server 204 recognizes that a set of dependent programs are to be configured for cooperative operation.

If there are any dependencies, then at step 1416, the necessary configuration files are generated and the client's registry is updated to reflect the dependencies. For example, the configuration files may identify locations where other programs or files are installed, or identify back-end programs (e.g., an editor or e-mail program) that are used by an application. Thus, if all of the interdependent computer programs sharing a common dependency code are included in the (first plurality of) computer programs listed in the user's profile, the initial configuration server 204 automatically generates configuration files that are required to execute any of the (first plurality of) interdependent computer programs in the client, without executing any installation programs associated with any of the first plurality of computer programs.

For example, if Microsoft Outlook is to be installed on the client, Outlook either uses Microsoft Word as an editor if Word is installed, or uses Microsoft Wordpad or Notepad as an editor if Word is not installed. Using the above described method, based on the database query and the user's profile, the initial configuration server writes out the configuration files for the bootable disk image to identify what program Outlook uses for an editor, and the location at which the editor program is to be installed.

As another example, Microsoft Internet Explorer may be configured to operate with one or more plug-ins (e.g., RealPlayer and Adobe Acrobat Reader). In the dependency database, all three of these applications may have a common plug-in code, nnnnn. If a user's profile includes Internet Explorer, RealPlayer and Acrobat, then upon querying the database, the initial configuration server 204 would recognize that Internet Explorer, RealPlayer and Acrobat all share the code nnnnn. Flags corresponding to RealPlayer and Acrobat are overwritten onto the Internet Explorer configuration files, to reflect that both plug-ins are included in the client's configuration.

Thus, according to the exemplary embodiment, a complete client image is automatically prepared "on-the-fly," generating configuration files and registry updates for cooperative operation of multiple applications, without running the install programs for each program.

On the other hand, if only one of the applications corresponding to a code is included in the user's profile, then there is no need to make any changes to account for dependencies. If there are no dependencies, then at step 1414, the necessary configuration files are generated and the client's registry is updated to reflect that there are no dependencies, without executing any installation programs associated with any of the first plurality of computer programs.

For example, the database may identify that Microsoft Internet Explorer and Adobe Acrobat reader share a plug-in dependency code, because Acrobat can be launched within Internet Explorer. However, if the user's profile only includes Internet Explorer, and does not include Acrobat, there is no need to make any adjustment in the configuration files.

After querying the database and noting that Internet Explorer has a dependency code, the initial configuration server 204 recognizes that there is no other program listed in the user's profile sharing the same dependency code as Internet Explorer. Internet Explorer can be downloaded and run on the client 132, 141a in the same manner as though no dependency exists.

At step 1418, the server 204 automatically downloads computer program files corresponding to the first plurality of computer programs from the server 204 to the client 132, 141a. This download constitutes a complete image, including configuration files and registry updates.

In a variation of the exemplary embodiment, once the configuration files for a particular user's profile have been generated by the initial configuration server 204, the files may be stored in the server and applied each time the user re-connects and downloads a bootable disk image. Alternatively, once the dependency information is retrieved from the database query, the information may be merged into the user's profile to which that dependency information pertains.

Figure 15:
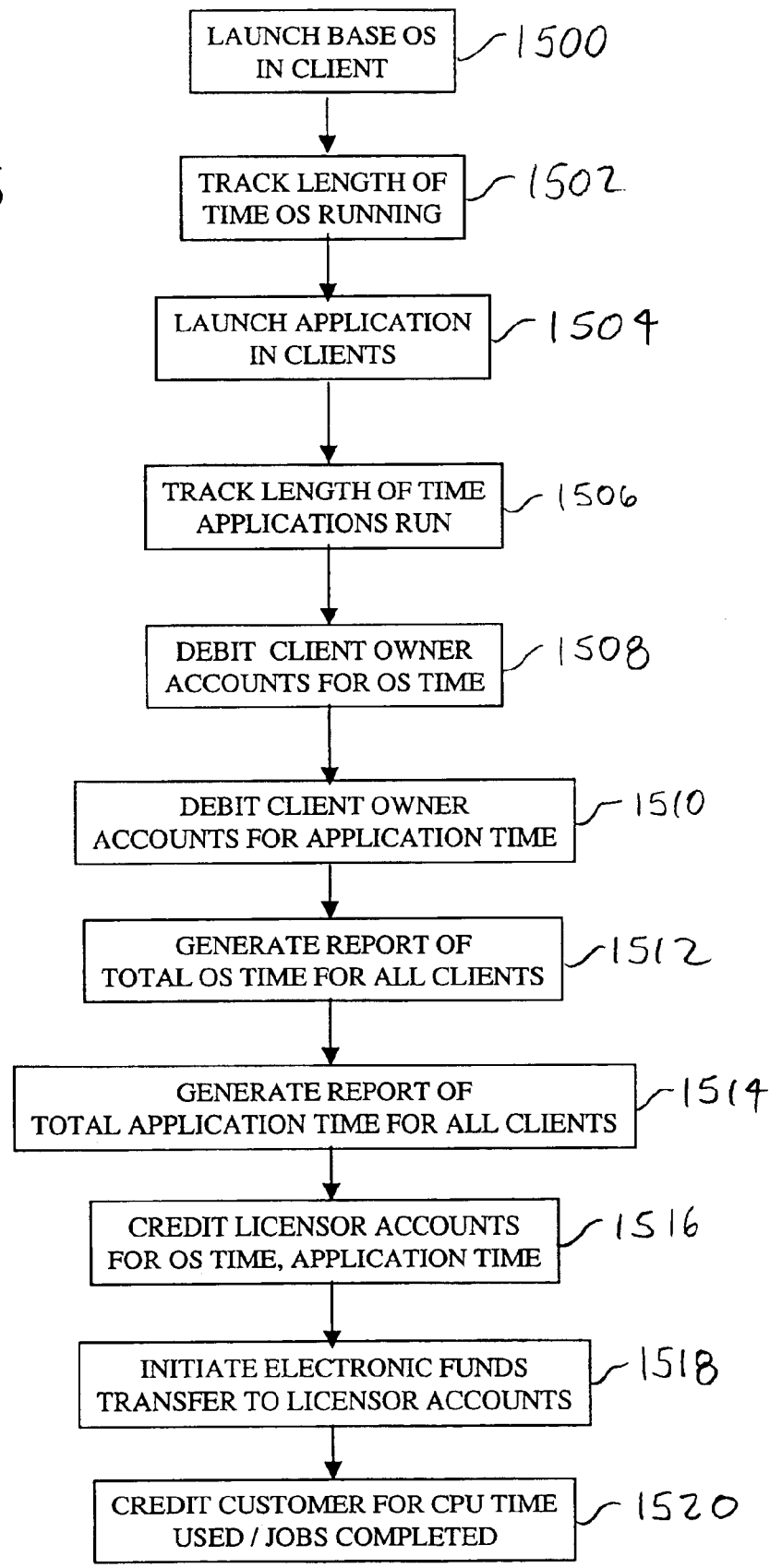
FIG. 15 is a flow chart diagram showing a method for an exemplary chargeback system suitable for use in the system shown in FIGS. 1A and 1B.

FIG. 15 is a flow chart diagram of an exemplary method for "leasing" software. According to this method, users who participate in the system can pay for the OS software and application software based on the time that they are logged onto the server 200.

At step 1500, initial configuration server 204 downloads at least a first portion of a base OS 400 to the client 132, 141a after startup of the client, and the base OS 400 is launched in the client 132, 141a.

At step 1502, the license/accounting server 218 automatically tracks a first length of time, during which the client 132, 141a runs the base operating system 400.

At step 1504, one or more of the application programs in the user's profile are launched in the client 132, 141a.

At step 1506, server 218 tracks a second length of time during which the client 132, 141a runs the application program(s).

At step 1508, the server 218 automatically debits a first account record in the server by a first amount based on the length of time that the base OS 400 is used. The first account record is associated with the user who owns the client. The first account record is used to determine the amount of money to be charged to the user who owns the client 132, 141a based on use of the system.

The server 218 also automatically credits a second account record by a second amount based on the (first) length of time that the base OS 400 is used. The second account record is associated with a licensor of the base operating system.

At step 1510, the server 218 debits another account record in the server by an amount based on the length of time that the applications are used by the client. The second account record is associated with the user who owns the client 132, 141a, and is used to determine the amount of money to be charged to the user who owns the client 132, 141a based on use of each individual application program. Alternatively, the charge may be based on the total time that the client 132, 141a is connected to the server 218, and may be assessed for all of the applications in the profile that the user currently has active. Further, the user's profile may indicate whether the user has purchased a full license for any OS or application product, in which case no hourly charges are assessed against that user for that particular application, unless and until and updated version of the application is downloaded from server 212 to the client 132, 141a.

At step 1512, assuming the system has one or more clients and one or more users, the server 218 can generate a periodic report (e.g., daily, weekly or monthly) identifying total use of the base operating system by the one or more clients over each period of time.

At step 1514, in a similar manner, the server 218 can generate a periodic report (e.g., daily, weekly or monthly) identifying total use of each application program by the one or more clients over each period of time.

In one variation of the exemplary embodiment, all OS and application charges against the user's account are accumulated, along with Internet telephone usage time, and the user's account is automatically billed once monthly. Alternatively, if the user has arranged for direct and continuous payments, a credit card, bank or pre-paid spending account of the user may be charged automatically each time the user makes use of the system.

At step 1516, the server 218 automatically credits one or more account records, each associated with a respective licensor of the base OS 400, secondary OS 410 or applications 406, 408. These accounts are credited by amounts that are based on the length of time the base OS 400, secondary OS 410 and applications 406, 408 are used.

As an alternative, a user may choose to lease the software on a (weekly or monthly) flat rate basis, with unlimited use. If the user intends to work with a program intensively, if may be more economical to pay a flat fee (e.g., $10–20 per month) than to pay an hourly rate (e.g., $0.50 to $1 per hour). License/accounting server 218 recognizes the specific license payment plan the each user employs, and charges the user accordingly.

At step 1518, the server 218 may periodically initiate an electronic payment to the licensor of the base OS 400, secondary OS 410 or applications 406, 408 based on the total use of these products by the clients of the system. Alternatively, the server 218 may generate a report for the total use of each licensor's products by the plurality of clients (preferably itemized by licensed program product), and the system owner can use the reports to manually initiate payments as part of its regular accounting and finance activity.

Because there is no need for the users to purchase software to be installed locally, users can license software on a pay-as-you-go basis, thus reducing high up front investments for software purchases. The system allows households and/or businesses that could not traditionally afford to purchase conventional computer systems and software to obtain a fully functional computing platform as well as access to the Internet and software.

The user of appliance 132 cannot illegally copy or pirate software, because all software is licensed through the remote servers 210, 212, and is not stored in any nonvolatile storage device within appliance 132. Software companies may also experience great saving by no longer needing to provide the same number of retail packaged disks/CD ROMS. These companies can also experience a substantial reduction in software installation support staff and telephone operator expenses because there is no need for programs to be installed. An additional benefit for the licensor is that the licensor need only collect payment from the system owner, instead of from each individual user.

Another variation of the exemplary method of allowing the user to rent OS and application software by the minute, hour or day includes the additional step of determining the total amount of time a user has used an application and providing purchase discounts or rent abatements based on predetermined levels of usage. For example, a user who pays an amount of R times the retail purchase price of an OS or software application (where R is a predetermined real number greater than 1.0) may not be charged any further for use of that application. Alternatively, a user may accrue a discount towards the purchase of a license for a product, as a percentage of "rent" previously paid for that product. Either of these options may be coded into the chargeback software in server 218. In order to implement either of these features, the licensor would require detailed reports of individual user utilization of individual programs, so that the licensor receives a full accounting of the basis upon which license revenue is collected and paid to the licensor.

In a completely paperless system, the system owner provides each software licensor with a data file identifying usage of each of the licensor's products by each user of the system, with the duration, time and date of usage. An electronic funds transfer may be performed at the same time the data file is transmitted to the licensor.

In addition to charges based on OS and application program use and Internet telephone usage, the user may be automatically charged storage charges, which may, for example, be based on a charge per day for each 100 megabytes of storage used in the user storage server 208.

At step 1520, the system may optionally provide a credit to a user for allowing the system to use "spare cycles" of the client processor to perform computations in behalf of a distributed application running on one of the special purpose backend servers 202.

An example might be a numerically intensive graphics computing task for a movie producer. The movie producer submits a program and data to be processed by the program. The program is executed on one of the backend servers 202. The backend server breaks the data up into small portions that can be parceled out to run on individual computers/appliances/workstations. Users of the system have the option of allowing their client processors to process portions of the data, in exchange for credits towards their monthly bill. The job is run, using participating clients as a "Network of Workstations".

Parallel computing using a large number of networked workstations is known in the art. A LAN implementation of a network of workstations (NOW) developed at the University of California at Berkeley is describe in Anderson, T. E., Culler, D. E., Patterson, D. A, et al., "A Case for Networks of Workstations: NOW." IEEE Micro, February, 1995; and Culler, D. E., Arpaci-Dussseau, A., Arpaci-Dusseau, R., Chun, B., Lumetta, S, Mainwaring, A, Martin, R., Yoshikawa, C. Wong, F., "Parallel Computing on the Berkeley NOW," JSPP'97 (9 *th Joint Symposium on Parallel Processing*), Kobe, Japan, both of which are expressly incorporated by reference herein in their entireties.

In addition, the U.C. Berkeley SETI (Searching for Extraterrestrial Intelligence) team has established a "SETI@home" project using thousands of distributed computers, described in the online article, Ron Hipshman, How SETI@home works (visited Nov. 30, 1999) <http://www.setathome.ssl.berkeley.edu/about seti/about seti at home 1.html>, which is expressly incorporated by reference herein in its entirety. In the SETI@home project, participants install the SETI@home screen saver program on their individual computers. The screen saver activates when there has been no keyboard or pointing device input for a predetermined period of time, as is known in the art. When the screen saver is active, the processor executes the SETI@home job. Using one option, the SETI@home program operates without requiring any user interaction, to: (1) connect to the SETI@home site, (2) download data to process, (3) disconnect from the SETI@home site, (4) perform computations to process the data, (5) re-connect to the SETI@home site, (6) upload processed results, (7) download new data to process, and (8) disconnect from the SETI@home site. If the user enters any input (via keyboard or pointing device), or shuts the computer down, the SETI@home job is suspended, but resumes whenever the computer is available and is not currently being used.

The exemplary embodiment of the invention adds to the distributed processing model of SETI@home. In the exemplary embodiment, a participating user's configuration would include the screen saver application. When the client 132, 141 connects to the back end server 202, the client downloads the data processing routine in addition to the data to be processed. Thus, the computations to be performed (and application program code) may be different each time the client receives additional data to be processed. The program code, data, and program context may be downloaded in three distinct portions of an "Active Message," for example.

As an alternative method, the user may have the option of manually controlling when the system performs uploads and downloads program files and/or data for the purpose of processing data on behalf of the system owner. The user can also be provided manual control over when the processing is performed, similar to the controls that are available on conventional screen savers.

Preferably, each time a client 132, 141 completes a unit of computation and uploads a set of results to the server 202, the user's account is credited by an amount that is either fixed or varies based on number of computations performed. Preferably, the credit to be given is independent of the type of client hardware 132, 141 owned by the user, and is independent of the time required to complete the task or the number of times the job is suspended while the client 132, 141 is in use by its owner. The credit information is applied by the license/accounting server 218.

The license/accounting server 218 also tracks the projects on which the client has earned credits. The owner of system 100 can then rebill the computation services to the corresponding ultimate data recipients.

This capability may also be used to provide computational services to not-for-profit institutions. In the case of a not-for-profit institution, the system owner has a variety of options. For example, instead of applying a credit to the account of the user that allows his or her computer to process data for the not-for-profit institution, the system may generate an acknowledgment. The program may compute an amount of time that the computer 132, 141 processes data on behalf of the system. The user can determine a fraction of the total computer usage that is devoted to performing computational services on behalf of the not-for-profit institution and amortize the computer hardware expenses on this basis. The system may prompt the user for information regarding the type of hardware the client is using and purchase price of the hardware, and together with usage information generated by the computer or input by the user, calculate a fraction of the cost of purchasing and operating client 132, 141 that is devoted to performing computational services on behalf of the not-for-profit institution, for tax purposes.

Alternatively, an acknowledgment may recite a fair market value for the computational services performed. As another option, the system owner may implement a matching program, by which the user's donation of computer services and/or amortized computer hardware/software is matched by a donation from the system owner. Alternatively, the system owner may give a credit to the user, without rebilling the not-for-profit institution.

Figure 16:
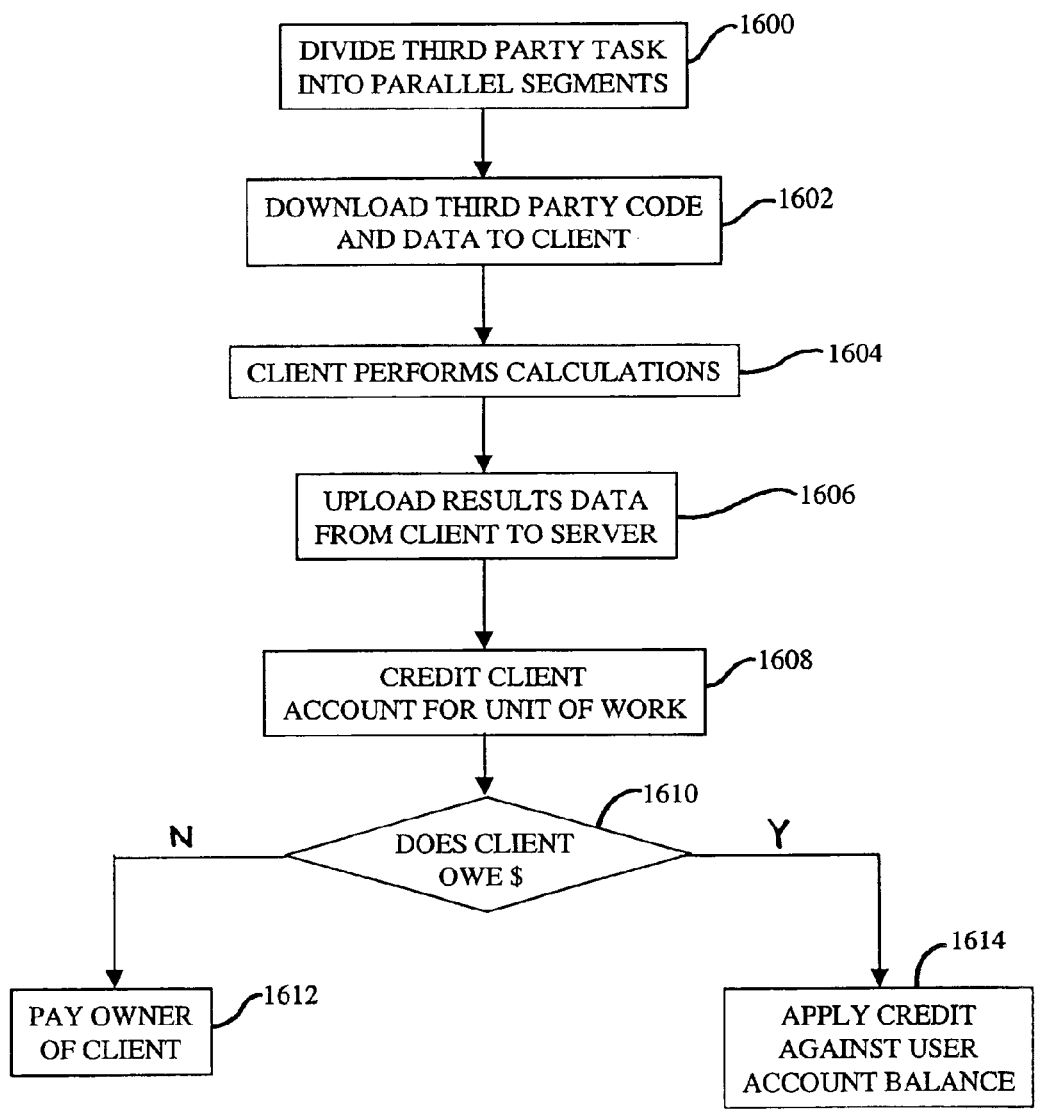
FIG. 16 is a flow chart diagram showing a method for applying credits for third party calculations performed on client processors.

The example recited above involves a user that rents software and purchases services from the system owner, and receives a credit towards the user's bill. The principles of the above described method and system may also be utilized by users who neither rent software or services from the system owner, but merely sell calculation services to the system owner, as shown in FIG. 16. For example, the system owner may provide a bootable disk (e.g., a floppy disk) that allows the user to connect to the server farm 100, but identifies the user as only having access for purpose of performing calculations on behalf of third party customers of the system owner. The floppy contains a boot operating system and connection software to access the initial configuration server 204. At step 1600, the server divides the third party customer's application into small modules that are executable in parallel, by any desired number of (client) processors. At step 1602, when the user connects to the server 204, only the base operating system, accounting system agent, and a set of executable application program instructions are downloaded to the client. At step 1604, the client may immediately launch the third party application module(s) and perform the computations. At step 1606, when the client completes a unit of work, the results are transmitted back to the back-end server 202, and at step 1608, the license/accounting server 218 credits a record associated with the user's account. At step 1610, if the client owes the system owner money for software rental or services, then at step 1614, a credit is applied against the users account balance. In the present example, at step 1612, the user is paid for providing the service, and the system owner receives its payment from the third party customer. This option does not require the user to be a regular subscriber to the system 100, and does not require the user to reformat the hard drive of a PC client 141.

Another method includes running a third party's application or a portion thereof on the user's computer (the client 132, 141). This variation allows the program code, data and context to be changed on the fly via an "Active Message" from the server, as described above, and allows the crediting of the user's account, without requiring the user to rent software from the server owner. This would allow use of the client without a reboot. Other variations are also contemplated.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provided a unique device that operates analogously to specific logic circuits.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for operating a computer system Including a server and a client, comprising the steps of:
   (a) based on a selection made by a user of the client, downloading a first portion of an application program from the server to the client, the first portion of the application program containing a first plurality of program files, the application program further including a second portion containing a second plurality of program files, the second plurality of program files not being included in the first plurality of program files, the application program being designed to operate at the client only with the first plurality of program files stored locally and the second plurality of program files stored locally;
   (b) launching the application program in the client, while the first portion of the application program is stored locally in the client, but the second portion of the application program is not stored locally In the client;
   (c) processing in the client, a request for one of the second plurality of program files, wherein the request is based on the selection made by the user;
   (d) automatically downloading at least one of the second plurality of program files from the server to the client; and
   (e) using the at least one of the second plurality of program files in the client.

2. The method of claim 1, including, before step (a), the steps of
   (1) Selecting the first plurality of program files to include program files that are expected to be used frequently; and
   (2) selecting the second plurality of program files to include program files that are not expected to be used frequently.

3. The method of claim 1, wherein step (d) includes downloading all of the second plurality of program files from the server to the client.

4. A method for configuring computer programs on a client that is coupled to a server, comprising the steps of:
   (a) identifying a first plurality of computer programs that are listed in a user profile associated with a user of the client, the first plurality of computer programs being associated with the user;
   (b) querying a database identifying dependencies among a second plurality of computer programs that are stored on the server, the first plurality of computer programs being a subset of the second plurality of computer programs;
   (c) identifying dependencies among the first plurality of computer programs based on the querying; and
   (d) automatically generating configuration files for downloading to the client and that are required to execute any of the first plurality of computer programs in the client, without executing any installation programs associated with any of the first plurality of computer programs.

5. The method of claim 4, further comprising automatically downloading computer program files corresponding to the first plurality of computer programs from the server to the client.

6. The method of claim 4, further comprising, before step (a), the step of:
   storing a plurality of codes in the database, each code associated with a respective dependency between at least two of the second plurality of computer programs.

7. The method of claim 6, wherein step (d) Includes:
   generating the configuration files to reflect a dependency between the at least two of the second plurality of computer programs, if all of the at least two of the second plurality of computer programs are included in the first plurality of computer programs.

8. The method of claim 7, wherein step (d) further includes:
   generating the configuration files so as not to reflect the dependency between the at least two of the second plurality of computer programs, if the at least two of the second plurality of computer programs are not all included in th first plurality of computer programs.

* * * * *

UNITED STATES PATENT AND TRADEMARK OFFICE
CERTIFICATE OF CORRECTION

PATENT NO. : 6,854,009 B1
DATED : February 8, 2005
INVENTOR(S) : Hughes

It is certified that error appears in the above-identified patent and that said Letters Patent is hereby corrected as shown below:

Column 7,
Line 63, "users profile" should read -- user's profile --

Column 8,
Line 23, "are need" should read -- are needed --
Line 64, "back-end" should read -- backend --

Column 9,
Line 38, "users profile" should read -- user's profile --

Column 10,
Line 9, "like.)," should read -- like), -
Line 37, "users profile" should read -- user's profile --

Column 13,
Line 8, "OS's 410 operate" should read -- OS's 410 to operate --

Column 16,
Line 48, "later, everything" should read -- later; everything --

Column 21,
Line 55, "files.," should read -- files, --

Column 25,
Line 42, "and updated version" should read -- an updated version --

Column 26,
Lines 3-4, "if may be more economical" should read -- it may be more economical --

Column 27,
Line 20, "is describe" should read -- is described --

UNITED STATES PATENT AND TRADEMARK OFFICE
CERTIFICATE OF CORRECTION

PATENT NO. : 6,854,009 B1
DATED : February 8, 2005
INVENTOR(S) : Hughes

It is certified that error appears in the above-identified patent and that said Letters Patent is hereby corrected as shown below:

Column 30,
Line 64, "th first plurality" should read -- the first plurality --

Signed and Sealed this

Seventh Day of June, 2005

JON W. DUDAS
*Director of the United States Patent and Trademark Office*